United States Patent
Tempel et al.

(10) Patent No.: US 12,344,534 B2
(45) Date of Patent: Jul. 1, 2025

(54) PROCESS FOR PRODUCING CARBON FIBER MATERIALS FOR SEPARATING $CO_2$ OR $NH_3$ FROM GAS MIXTURES, CARBON FIBER MATERIALS AND ITS USE

(71) Applicant: Forschungszentrum Jülich GmbH, Jülich (DE)

(72) Inventors: Hermann Tempel, Kreuzau (DE); Ansgar Karl Georg Kretzschmar, Aachen (DE); Victor Octavian Selmert, Aachen (DE); Henning Weinrich, Jülich (DE); Hans Kungl, Heidelberg (DE); Rüdiger-A Eichel, Jülich (DE)

(73) Assignee: Forschungszentrum Jülich GmbH, Jülich (DE)

( * ) Notice: Subject to any disclaimer, the term of this patent is extended or adjusted under 35 U.S.C. 154(b) by 304 days.

(21) Appl. No.: 17/596,349

(22) PCT Filed: Jun. 3, 2020

(86) PCT No.: PCT/EP2020/065373
§ 371 (c)(1),
(2) Date: Dec. 8, 2021

(87) PCT Pub. No.: WO2020/249441
PCT Pub. Date: Dec. 17, 2020

(65) Prior Publication Data
US 2022/0220639 A1    Jul. 14, 2022

(30) Foreign Application Priority Data
Jun. 13, 2019   (DE) .......................... 102019208643.8

(51) Int. Cl.
*C01C 1/02* (2006.01)
*B01J 20/28* (2006.01)
(Continued)

(52) U.S. Cl.
CPC ........... *C01C 1/02* (2013.01); *B01J 20/28023* (2013.01); *B01J 20/3085* (2013.01); *D01F 9/22* (2013.01);
(Continued)

(58) Field of Classification Search
CPC ........ C01C 1/02; D01F 9/22; B01J 20/28023; B01J 20/3085; B01J 20/20; F01N 3/0857
See application file for complete search history.

(56) References Cited

U.S. PATENT DOCUMENTS

2007/0048521 A1   3/2007   Istvan
2013/0126794 A1   5/2013   Lee et al.
2016/0036037 A1   2/2016   Rhodes et al.

FOREIGN PATENT DOCUMENTS

CN    104466168 A   3/2015
CN    104511279 A   4/2015
(Continued)

OTHER PUBLICATIONS

International Search Report for International Application No. PCT/EP2020/065373 dated Oct. 22, 2020, 7 pages.
(Continued)

*Primary Examiner* — Mathieu D Vargot
(74) *Attorney, Agent, or Firm* — EVENTIDE LAW LLC

(57) ABSTRACT

A method for producing a carbon fiber material is disclosed, the method comprising the steps of
  a) Preparation of a solution of polyacrylonitrile in a suitable organic solvent
  b) Electrospinning of the solution obtained in a) and drying of the obtained fiber material
  c) Crosslinking of the obtained fiber material by heating to 150 to 350° C. in an air or oxygen atmosphere for 1 to 30 h
  d) Carbonization of the obtained fiber material in an inert gas atmosphere at a temperature in the range of 500 to 2,500° C.,
characterized in that
no silicon, sulfur, metal compounds, intermetallic compounds, silicon compounds and/or sulfur compounds are added to the polyacrylonitrile solution in step a) and that neither stabilization nor surface modification steps are carried out with the fiber material by treatment with chemical reagents and/or exposure to tensile stress.
Also disclosed is a carbon fiber material obtainable by the above process, as well as a carbon fiber material, charac-
(Continued)

terized in that it has a proportion of ultramicropores $V_{<0.4\ nm}$ of 0.01 to 10, more preferably 0.02 to 5, even more preferably 0.025 to 0.1, most preferably 0.03 to 0.06 $cm^3/g$, determined by $CO_2$ adsorption tests and evaluation with DFT and GC-MC simulation.

9 Claims, 13 Drawing Sheets

(51) Int. Cl.
    *B01J 20/30*     (2006.01)
    *D01F 9/22*     (2006.01)
    *F01N 3/08*     (2006.01)
    *B01J 20/20*     (2006.01)
    *D06M 101/40*     (2006.01)

(52) U.S. Cl.
    CPC ............. *F01N 3/0857* (2013.01); *B01J 20/20* (2013.01); *D06M 2101/40* (2013.01)

(56) References Cited

FOREIGN PATENT DOCUMENTS

| CN | 106362684 A | 2/2017 |
|---|---|---|
| CN | 106582148 A | 4/2017 |
| CN | 107051382 A | 8/2017 |
| WO | 2019004974 A2 | 1/2019 |

OTHER PUBLICATIONS

Singh et al., "Removal of disinfection byproducts from water by carbonized electrospun nanofibrous membranes," Separation and Purification Technology, 2010, 11 pages.

Kim et al., "Evaluation of CO2 adsorption capacity of electrospun carbon fibers with thermal and chemical activation," Journal of Applied Polymer Science, Jul. 2017, 9 pages.

Salvador et al., "Mechanism of heterogeneous adsorption in the storage of hydrogen in carbon fibers activated with supercritical water and steam," Science Direct, International Journal of Hydrogen Energy, 2011, 13 pages.

Zhang et al., "Carbon nanofibers with nanoporosity and hollow channels from binary polyacrylonitrile systems," European Polymer Journal, 2009, 10 pages.

Hsiao et al., "Preparation of high-surface-area PAN-based activated carbon by solution-blowing process for CO2 adsorption," Separation and Purification Technology, 2011, 9 pages.

Im et al., "Hydrogen storage evaluation based on investigations of the catalytic properties of metal/metal oxides in electrospun carbon fibers," Science Direct, International Journal of Hydrogen Energy, 2009, 7 pages.

Shen et al., "Hierarchical porous polyacrylonitrile-based activated carbon fibers for CO2 capture," Journal of Materials Chemistry, 2011, 5 pages.

Li et al., "Nitrogen-enriched porous polyacrylonitrile-based carbon fibers for CO2 capture," Industrial & Engineering Chemistry Research, Aug. 4, 2018, 29 pages.

Schierholz et al., "The carbonization of polyacrylonitrile-derived electrospun carbon nanofibers studied by in situ transmission electron microscopy," Royal Society of Chemistry, 2019, 11 pages.

Travis, "Porous Carbon Based Solid Adsorbents for Carbon Dioxide Capture," A Thesis Submitted for the Degree of Doctor of Philosophy, University College London, Aug. 2014, 181 pages.

Nandi et al., "Unprecedented CO2 uptake over highly porous N-doped activated carbon monoliths prepared by physical activation," Chemical Communications, Oct. 2012, vol. 48, No. 83, 4 pages.

Scholes et al., "Carbon Dioxide Separation through Polymeric Membrane Systems for Flue Gas Applications," Recent Patents on Chemical Engineering, 2008, 15 pages.

Van Leeuwen, "Derivation of Stockmayer potential parameters for polar fluids," Fluid Phase Equilibria, 1994, 18 pages.

Goncalves et al., "Ammonia Removal Using Activated Carbons: Effect of the Surface Chemistry in Dry and Moist Conditions," Environmental Science & Technology, 2011, 6 pages.

Kanezashi et al., "Characteristics of Ammonia Permeation Through Porous Silica Membranes," AIChE Journal, May 2010, vol. 56, No. 5, 9 pages.

(a) C600, (b) C700, (c) C800, (d) C900, (e) C1000

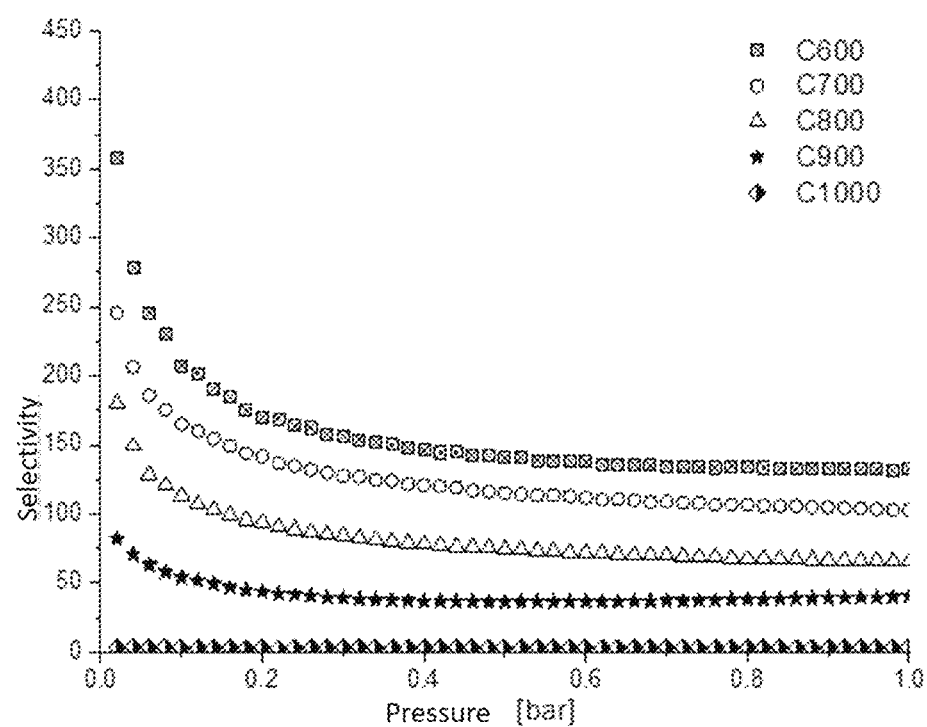

PROCESS FOR PRODUCING CARBON FIBER MATERIALS FOR SEPARATING $CO_2$ OR $NH_3$ FROM GAS MIXTURES, CARBON FIBER MATERIALS AND ITS USE

The present invention relates to a process for producing a carbon fiber material for separating $CO_2$ or $NH_3$ from gas mixtures, a carbon fiber material obtainable by the process, a process for separating $CO_2$ or $NH_3$ from gas mixtures using the carbon fiber material, and the use of the carbon fiber material for separating $CO_2$ or $NH_3$ from gas mixtures.

BACKGROUND OF THE INVENTION

At present, global warming is one of the major environmental problems. Due to the very widespread burning of fossil fuels for energy production and intensive agriculture, the amount of $CO_2$ in the atmosphere is continuously rising sharply, leading to problems such as the greenhouse effect, melting of polar ice caps and glaciers, and rising sea levels. Raw natural gas and biogas also contain large amounts of $CO_2$, which must be captured before they can be fed into the natural gas supply network or used as an energy source.

Intensive work is therefore being done on developing technologies to remove $CO_2$ from exhaust gases such as power plant or industrial waste gases or from the atmosphere in order to avoid these negative environmental effects. The $CO_2$ extracted in this way can either be stored underground or under the sea (so-called CCS technology (carbon capture and storage), or it can be further processed into basic materials for industrial use such as synthesis gas ($CO/H_2$), methane or ethylene.

Several processes are known for $CO_2$ capture from flue gases, in particular so-called post-combustion capture, i.e. a scrubbing process (downstream of flue gas desulfurization) with a hydrogen carbonate solution (carbonate scrubbing), an amine solution (amine scrubbing), methanol or other substances that can bind $CO_2$. The so-called oxyfuel process is also known, in which the actual combustion is carried out with pure oxygen instead of air, and high doses of $CO_2$ are added to prevent the combustion temperature from rising too high. The flue gas then consists mainly of $CO_2$ and water vapor, which can be easily removed by condensation, so that $CO_2$ can be recovered reasonably pure and returned to the process.

Furthermore, $CO_2$ capture technologies using active materials on which $CO_2$ is selectively adsorbed are already known. These include pressure swing adsorption processes and membrane technology processes. Cryodistillation technology is also known to be used to separate $CO_2$ from gas mixtures.

There is also increased interest in the separation of ammonia ($NH_3$) from gas mixtures, partly because ammonia can be used to generate energy in ammonia fuel cells. Ammonia is found—bound as ammonium—in large quantities in production wastewater, municipal wastewater or fermentation residues, which to date have been lost unused and pollute water bodies. Membrane distillation processes for the recovery of ammonia from gases for ammonia fuel cells are therefore already being developed (e.g. "Ammonia-to-Power" project, AEEE). Such a separation process would be advantageous for the post-treatment of synthesis exhaust gases containing ammonia or for the post-treatment of ammonia fuel cells or electrolysers in which ammonia is produced (e.g. project "Power-to-Ammonia" of RWTH Aachen University in cooperation with the applicant).

In the pressure swing adsorption process, special porous materials (e.g. zeolites, activated carbon) are used as adsorbents. The separation effect can be based on two different principles: separation due to equilibrium adsorption or separation due to molecular sieving effect. In the first case, one of the components to be separated is adsorbed more strongly than another, thus an enrichment of the poorly adsorbed component in the gas phase takes place. In the second case, certain molecules penetrate the porous structure of the adsorbent more quickly. If the gas mixture now flows through the adsorbent in a reactor bed, the component that penetrates the pores less quickly needs less time to flow past, i.e. it is more likely to reach the outlet of the reactor bed. The gas is introduced under increased pressure (usually 6 bar to 10 bar) into a fixed-bed reactor filled with the adsorbent, so that it flows through it. One or more components of the mixture (these are called "heavy components") are now adsorbed. At the exit of the bed, the so-called "light component" can be taken out in concentrated form. After a while, the adsorber bed is largely saturated, and some of the heavy component also escapes. At this moment, valves switch the process so that the outlet for the light component is closed and an outlet for the heavy component is opened.

This is accompanied by a reduction in pressure. At the low pressure, the adsorbed gas is now desorbed again and can be recovered at the outlet. Two alternately charged and discharged adsorbers allow continuous operation. In order to expel the supernatant of desorbed heavy component from the adsorber bed, the adsorber is rinsed with a portion of the desired product to avoid contamination. The exact adjustment of the switching times is carried out according to the desired purity of the gases. The increase in one component is always at the expense of its recoverable amount and the purity of the other component. Pressure swing adsorption is used when the desorption energy is low and the concentration is high. Thus, it is applied to the separation of air for the recovery of $N_2$ (>99.9%), $O_2$ (<97%) or argon, as well as recovery/purification of hydrogen, e.g. for fuel cells. Another application is the removal of $CO_2$ from biogas or the removal of water from compressed air.

Membrane technology is considered an energy-efficient alternative for separating numerous gases and solvent mixtures. Specific examples include separation of hydrogen from gasification and separation of hydrocarbons, upgrading of biogas and landfill gas, exhaust gas treatment, methane purification, and dehydration of organic solvents. In this context, inorganic microporous membranes have been intensively investigated due to their thermal and chemical stability. The membrane candidates include silica, zeolites, carbon molecular sieves, and graphene/graphene oxide membranes.

There are three mechanisms by which membrane separation can proceed in principle, namely by Knudsen diffusion, by the molecular sieve effect, or by solution diffusion.

Polymeric membranes are generally non-porous, and therefore gas permeation through them generally proceeds by the solution-diffusion mechanism. This is based on the solubility of specific gases in the membrane and their diffusion through the dense membrane matrix. In the case of polymeric membranes, a distinction is also made between rubber-like membranes, which operate above the glass transition temperature Tg of the polymer, and glass-like membranes, which operate below Tg.

Knudsen separation is based on certain gas molecules passing through membrane pores which are small enough to prevent the passage of the total gas.

The molecular sieve mechanism relies on size exclusion to separate gas mixtures. Pores within the membrane have a strictly controlled size relative to the kinetic diameter of the gas molecules. This allows the smaller gas molecules to diffuse at much higher rates than the larger gas molecules.

Membranes enable the separation of gas mixtures consisting of components with different kinetic molecular diameters because larger molecules are excluded by the membrane while the smaller molecules pass through it.

The adsorbents used for gas separation are mainly zeolites and carbon materials, in addition to MOFs (metal-organic frameworks) and polymers. The carbon adsorbents are mostly highly porous activated carbon materials, which in addition to high porosity have some selectivity for $CO_2$ adsorption. To increase this selectivity, the surfaces of the carbon materials are usually impregnated with bases such as KOH. For example, carbon from biomass impregnated in this way is widespread. For example, carbonized polymers such as carbonized polypyrrole, polyindole, melamine or urea resins, PVDF are known as adsorbents for $CO_2$.

Amine-functionalized or base-impregnated carbons of polyacrylonitrile fibers (hereinafter referred to as PAN fibers) and their use for adsorption of $CO_2$ are also already known. (Hsiao, H.-Y., Huang, C.-M., Hsu, M.-Y. & Chen, H. Preparation of high-surface-area PAN-based activated carbon by solution-blowing process for $CO_2$ adsorption. Separation and Purification Technology 82, 19-27; 10.1016/j.seppur.2011.08.006 (2011). Such PAN fibers are obtained, for example, by wet-spinning a PAN solution and subsequent carbonization (Hsiao, op. cit., Shen, W., Zhang, S., He, Y., Li, J. & Fan, W. Hierarchical porous polyacrylonitrile-based activated carbon fibers for $CO_2$ capture. J. Mater. Chem. 21, 14036; 10.1039/C1JM12585K (2011); Li, L. et al. Nitrogen-Enriched Porous Polyacrylonitrile-Based Carbon Fibers for $CO_2$ Capture. Ind. Eng. Chem. Res. 57, 11608-11616; 10.1021/acs.iecr.8b01836 (2018).

Also already known is the preparation of carbonized PAN fibers by electrospinning a PAN solution in dimethylformamide (DMF) and subsequent carbonization of the fibers (Kim, D. W., Jung, D. W., Adelodun, A. A. & Jo, Y. M. Evaluation of $CO_2$ adsorption capacity of electrospun carbon fibers with thermal and chemical activation. J. Appl. Polym. Sci. 134, 45534; 10.1002/app.45534 (2017). Urea is added to the polymer solution for activation prior to electrospinning. Carbonization is carried out at 200° C. for 4 h in air. This is followed by activation in a $CO_2$ stream at 600-800° C. for 15 min.

R. Schierholz et al. (RSC Adv., 2019, 9, 6267) describe the carbonization of non-pretreated PAN fibers when observed in situ under the microscope in ultra-high vacuum. The temperature is lowered to room temperature after each carbonization step and then raised to a higher temperature than in the previous step.

Other already known carbon adsorbents are carbonized bulk PAN, and carbonized PAN copolymer (Travis, W. Dissertation. University College London, 2014; Nandi, M. et al. Unprecedented $CO_2$ uptake over highly porous N-doped activated carbon monoliths prepared by physical activation. Chemical Communications (Cambridge, England) 48, 10283-10285; 10.1039/C2CC35334B (2012).

Carbon fiber adsorbents consist of highly porous carbon fibers processed into a nonwoven (fiber mat). The fiber mat therefore has fiber interstices that are comparatively large, in addition to the aforementioned pores of the fiber itself.

The disadvantage of the carbon adsorption materials known to date is their relatively low selectivity. The efficiency of separation also depends explicitly on the amount of adsorbate on the adsorbent. Adsorption occurs via van der Waals interactions with the pore walls as well as acid-base interactions.

Ultramicroporous zeolite adsorbents, on the other hand, are expensive and very sensitive to moisture.

CN 106 36 26 84 A discloses a process for preparing a nitrogen-containing carbon nanofiber material suitable for adsorption of $CO_2$. The process comprises a) adding a precursor polymer of carbon nanofiber to a solvent at room temperature and stirring the mixture for 12-24 hours until the precursor polymer is completely dissolved, obtaining a solution with 6-15 wt % polymer content, b) electrospinning this solution to produce a nanofiber material, c) carbonization, d) surface treatment, and e) activation treatment. Polypyrrole, PAN, polyimide, polybenzoxazine, polyvinylbutyral, polyaniline, polybenzimidazole, phenolic resin A, polyvinylpyrrolidone, polyvinyl alcohol, cellulose, cellulose acetate, and ethyl cellulose, and mixtures thereof are disclosed as precursor polymers. Carbonization is carried out by heating the precursor nanofiber material in a first step to 150 to 300° C. in air for preoxidation treatment for 0.5 to 5 h, and then heating to 600 to 1600° C. under inert gas for 0.5 to 20 h. The surface modification treatment comprises three steps: first oxidation with concentrated acid, in particular with a mixture of conc. $H_2SO_4$/conc. $HNO_3$ at 50 to 70° C. for 1 to 5 h, then multiple ultrasonic treatments with distilled water and drying for removal of residual N and S oxides from the surface, followed by etching treatment in an $NH_3$ atmosphere at 600 to 1000° C. for 2 to 5 h. In the activation treatment, the obtained nanofiber is stirred in a solution of potassium hydroxide or potassium carbonate until complete dispersion, filtered off, and then heated at 800-1000° C. under nitrogen protective gas for 0.5 to 2 h, then rinsed with HCl, washed with deionized water, and dried for 5 to 10 h at 50-80° C. The process is very time, labor and energy consuming due to the numerous steps involved.

It is known, e.g., from CN 106582148 A, to produce metal oxide-carbon fiber composites for air filter membranes by electrospinning and carbonization. The carbon comes from rapeseed, moss or cabbage, i.e. biomass. The metal oxide is e.g. $TiO_2$. After electrospinning, the obtained fibers are immersed in 5 M hydrochloric acid for 10 h at 60° C. and then washed and dried to remove impurities. In addition, the membrane may also contain silver nanoparticles, which are introduced during electrospinning.

Metal oxide-containing or intermetallic compound-containing carbon fibers obtained by electrospinning and carbonization are also known, for example, from CN 104466168 A, US 2007/0048521 A1 and US 2013/0126794 A1. Such materials are used as catalysts, e.g. for methane-carbon dioxide reforming, or mainly as electrode materials for lithium-ion batteries.

US 2016/0036037 A1 discloses a method for manufacturing a lithium-ion battery by electrospinning. Among other things, a conductive material obtained by electrospinning PAN and then carbonizing by a laser is disclosed, which contains elemental sulfur, sulfur-containing compounds such as $Li_2S$, silicon, silicon-containing compounds, or contains various metal mixed oxides.

WO 2019/004974 A2 discloses a process for the production of carbon nanofiber bundles by electrospinning, a stabilization step by low-temperature oxidation under tensile stress and subsequent carbonization. The carbon fibers obtained are intended for use as anode material in lithium-ion batteries.

It is particularly interesting to produce components suitable for the electrochemical reduction of $CO_2$ and the synthesis of $NH_3$. Since the electrochemical reduction of gases takes place at 3-phase boundaries and the efficiency depends on the proportion of the reaction gas in the gas stream, the reaction gas must be enriched in advance. For this purpose (i.e. for the separation and thus enrichment of e.g. $CO_2$ or $NH_3$), the inventors looked for suitable materials whose direct application in the reactor is possible. With the help of the fiber material, the electrochemical reduction of $CO_2$ with water or hydrogen to synthesis gas, methane, ethylene, formaldehyde, formic acid as well as other hydrocarbons and alcohols is to be carried out.

Furthermore, the power-to-ammonia method should ideally remove $NH_3$ from the resulting mixed gas stream on the product side.

Against this background, it is the object of the invention to provide a process for the production of carbon fiber material that overcomes the above-mentioned disadvantages and is easy and inexpensive to carry out, as well as providing a carbon fiber material that exhibits high selectivity for $CO_2$ or $NH_3$ and enables the adsorption of large amounts of these gases.

DESCRIPTION OF THE INVENTION

The inventors have found that the conditions of carbonization of PAN fibers has an important role in the production of carbon materials from PAN. Their influence on the generation of pores of certain sizes, such as ultramicropores, has been ignored until now. These ultramicropores allow selective adsorption by a molecular sieve effect without using acid-base interactions. Hereby, the reversibility of adsorption increases, and the application becomes more efficient. It has been shown in the context of the present invention that ultramicropores are the key to successful adsorption of large amounts of $CO_2$ with high reversibility and selectivity, especially at low relative pressures.

The problem of the invention is solved by the process according to claim 1, which comprises the following steps:
a) preparation of a solution of polyacrylonitrile in a suitable organic solvent
b) electrospinning the solution obtained in a) and drying the fiber material obtained
c) crosslinking of the obtained fiber material by heating at 150 to 350° C. in an air or oxygen atmosphere for 1 to 30 h
d) carbonizing the obtained fiber material in an inert gas atmosphere at a temperature in the range of 500 to 2500° C., preferably 600 to 900° C., more preferably 800 to 875° C.,
characterized in that
no silicon, sulfur, metal compounds, intermetallic compounds, silicon compounds and/or sulfur compounds are added to the polyacrylonitrile solution in step a), and that
neither stabilization nor surface modification steps are carried out with the fiber material obtained by treatment with chemical reagents and/or application of tensile stress.

In particular, the PAN solution in step a) does not contain metal compounds, intermetallic compounds, silicon compounds, sulfur, sulfur compounds, and/or silicon compounds disclosed, for example, in US 2013/0126794 A1, US 2016/00306037 A1, CN 106582148 A, CN 104511279 A. In the course of subsequent carbonization, these react in particular to form metal oxides, mixed metal oxides, or intermetallic compounds contained in the fibers. In contrast, according to the invention, the carbonized fibers consist only of the pyrolysis product of PAN.

Preferably, the solution in step a) consists only of solvent and polyacrylonitrile, preferably of DMF and polyacrylonitrile.

The fiber material obtained in step b) is crosslinked prior to the actual carbonization, e.g. at 250° C. for 3 to 30 h, preferably 8 to 20 h, more preferably overnight. As a result of the heating, the cyclization shown below in Scheme 1 in step a) occurs and thereby a crosslinking of the fibers takes place, which stabilizes the PAN fibers. In addition, surface oxidation and partial elimination of nitrogen compounds takes place in the course of crosslinking.

Surprisingly, it has been shown that with the aid of this process, which is significantly simplified compared to CN 106362684 A, carbon fibers can be obtained that exhibit particularly good, i.e. selective and high, $CO_2$ absorption. In particular, neither surface modification nor surface activation of the fibers after electrospinning by treatment with chemical reagents and/or application of tensile stress is necessary to achieve these properties.

Preferred embodiments of the process according to the invention are defined in claims 2 to 6.

The invention further comprises a carbon fiber material obtainable by said process, a carbon fiber material having a certain high proportion of ultramicropores with a pore size of <0.4 nm, and the use of the carbon fiber material for separating $CO_2$ or $NH_3$ from gas mixtures.

The carbon fiber material according to the invention is also referred to hereinafter as nanofiber mats.

DESCRIPTION OF THE FIGURES

The relationship between carbonization temperature and adsorption properties for Ar and $CO_2$ is shown in FIG. 1.

FIG. 17 shows IAST calculations for $CO_2/N_2$ selectivity.

DETAILED DESCRIPTION

Figure 1:
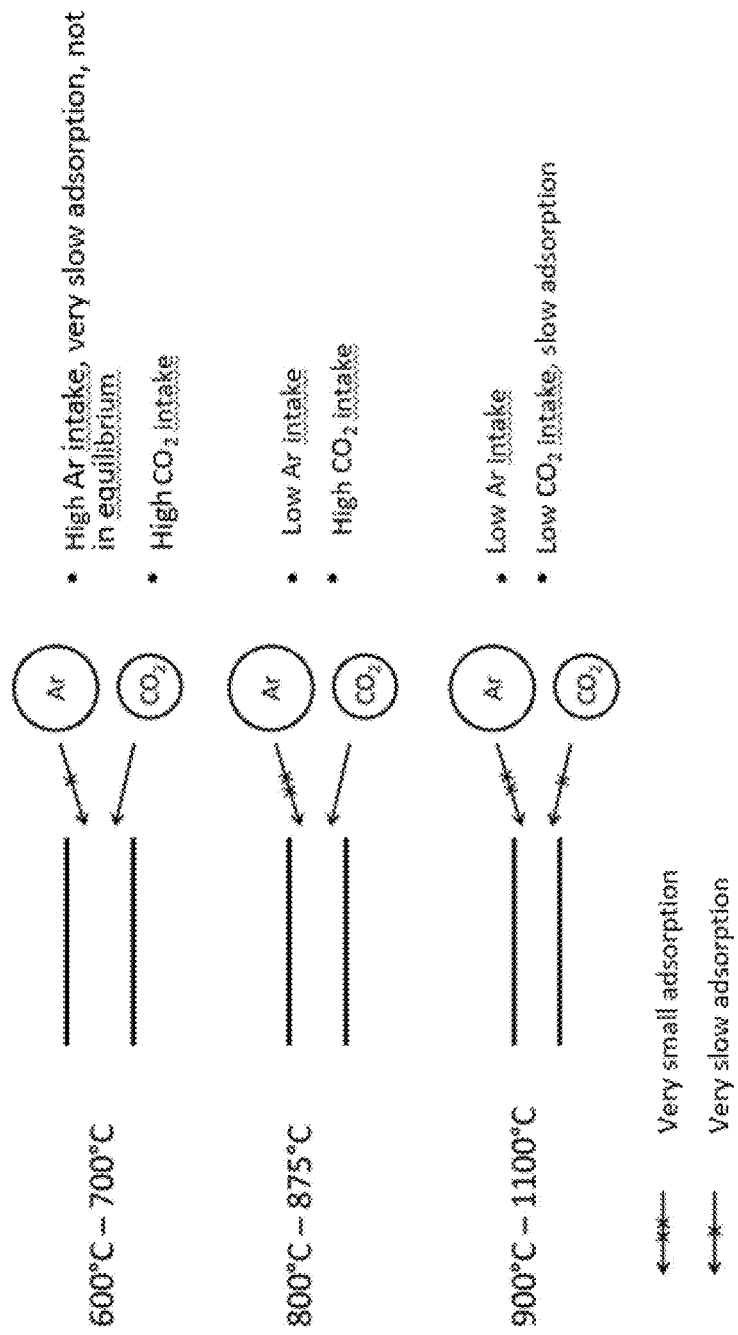

The carbon fiber material obtained by the method according to the invention has mainly ultramicropores in the fibers, whereas hardly any meso- or macropores. The carbon fibers are porous with pores of various sizes. According to the invention, the ultramicropores represent the largest proportion of the pores present in the fibers, while fewer meso- or macropores are present. As a result, a large amount of $CO_2$ or $NH_3$ can be reversibly adsorbed by the carbon fiber material according to the invention.

After carbonization in step c), the carbon fiber material is obtained as a nonwoven (nanofiber mat), which can be used directly as adsorption material in gas separation processes without further processing steps.

The thickness of the nonwoven obtained in step c) is typically 100 to 2000 μm, preferably 400 to 1000 μm, more preferably 600 to 900 μm, particularly preferably 800 μm, depending on the spinning time, when produced on a laboratory scale. However, the size and thickness of the nanofiber mat can be adjusted to much larger values after adjusting the electrospinning equipment.

According to the invention, the polyacrylonitrile (PAN) that can be used is a polyacrylonitrile homopolymer or a polyacrylonitrile copolymer containing up to about 5 to 10% by weight of one or more comonomers. Suitable comonomers include acrylic acid, methacrylic acid, itaconic acid and/or acrylamide. The polyacrylonitrile is either commercially available (e.g. from sigma-aldrich or BOC Sciences) or can be prepared in the usual way. The molecular weight of the PAN polymer in g/mol is preferably 50,000 to 200,000, preferably 80,000 to 180,000, particularly preferably 100,000 or 150,000.

Any organic solvent that can dissolve PAN is suitable as a solvent. In particular, a polar solvent such as dimethylformamide (DMF), dimethyl sulfoxide (DMSO), dimethylacetamide (DMAC), acetone, methyl ethyl ketone, ethanol or mixtures thereof are suitable. DMF is particularly suitable.

According to the invention, the PAN solution in step a) has a concentration of 5 to 20 wt %, preferably 10 to 15 wt %, particularly preferably about 10 wt %. It is prepared by adding the PAN to the solvent and stirring, optionally with heating, until the PAN is completely dissolved (optical control). It is stirred, for example, at room temperature for 2 days.

Electrospinning is a fiber manufacturing process that uses electrical force to draw charged filaments from polymer solutions or polymer melts up to a fiber diameter of several hundred nanometers. The process does not require the use of coagulation chemistry or high temperatures to produce solid filaments from solution. This makes the process particularly suitable for producing fibers from large and complex molecules. Standard laboratory apparatus for electrospinning consists of a spinneret (spinning die, typically one or more injection needle(s)), for example 4 or 16 needles, connected to a high-voltage DC power supply (e.g., 5 to 100 kV), a syringe pump, and a collector, which may be grounded or used at negative voltages of several kV. A polymer solution, sol-gel, particulate suspension, or melt is loaded into the syringe and this liquid is extruded from the needle tip at a constant rate by a syringe pump. Alternatively, the droplet at the tip of the spinneret can be replenished by feeding from a header tank at constant feed pressure. This constant pressure feed works better for low viscosity feedstocks. When a sufficiently high voltage is applied to a liquid droplet, the liquid body becomes charged and electrostatic repulsion counteracts the surface tension and the droplet is stretched; at a critical point, a liquid stream erupts from the surface. This breakout point is known as the Taylor cone. If the molecular cohesion of the liquid is sufficiently high, no stall occurs (if so, the droplets are electrosprayed) and a charged liquid jet is formed. As the jet dries in flight, the mode of current flow changes from ohmic to convective as the charge migrates to the surface of the fiber. The jet is then extended by an impact process initiated by electrostatic repulsion at small bends in the fiber until it is finally deposited on the grounded collector. The elongation and thinning of the fiber resulting from this bending instability leads to the formation of uniform fibers with nanometer diameters. The collector rotates on one side and the needle is also reciprocated laterally, resulting in a uniform thickness of the fiber mat. Drying of the fiber during spinning results in chaotic movement of the fiber and thus disorderly separation of the spun fiber and formation of a fiber mat. The collector can be, for example, a plate or a drum or also (in large-scale plants) a moving mat.

In the process according to the invention, electrospinning is carried out according to a standard procedure. Usually, an electrospinner, e.g. from IME Technologies, is used at 10 to 60%, preferably 15 to 35%, particularly preferably 20 or 30% relative humidity and 20 to 30° C., preferably 25° C. However, it has been shown that these environmental parameters have no significant effect on the properties of the carbon fiber material. For example, the flow rate is 20 to 60, preferably 30 to 50, and particularly preferably 40 μl/min per needle used, and the volume is 1.5 to 20 ml, preferably 2 to 15 ml. The spinning time depends on the volume and is, for example, 1 h or 2 h for 2.2 ml and 6 h for 14.6 ml. The voltage is e.g. 21 kV at the anode and −4 kV at the cathode. The collector rotates e.g. at 1000 to 2000 rpm, preferably 1500 rpm. The needle-collector distance is e.g. 100 to 200 mm, preferably 130 to 190 mm, especially 140 or 180 mm. The inner needle diameter is e.g. 0.5 to 1 mm, preferably 0.7 to 0.9 mm, in particular 0.8 mm. The lateral movement of the needle occurs over a total distance of 80 to 150 mm, preferably 90 to 130 mm, particularly preferably 100 or 120 mm. The speed of the lateral needle movement is e.g. 20 mm/s, and the reversal delay is e.g. 500 ms. In this way, PAN nanofiber mats are obtained.

After electrospinning in step b), the obtained nanofiber mats are preferably first dried, e.g. at 100 to 200° C., preferably about 150° C., for 1 to 24 h, preferably 1 to 2 h, particularly preferably for about 1 h in air atmosphere.

Subsequently, they are crosslinked in an air or oxygen atmosphere, e.g. at 150 to 300° C., preferably 200 to 300° C., particularly preferably 250° C. for 8 to 30 h, e.g. overnight.

According to the invention, the decisive step for adjusting the desired properties of the carbon fiber material is the carbonization of the nanofiber mats thus obtained in step c), and in particular the temperature. The temperature is an easily adjustable and controllable parameter, but its influence on the pore structure and gas adsorption properties has not yet been investigated.

Carbonization is a pyrolysis process. In this process, PAN fibers are transformed by cyclization, dehydrogenation and $N_2$ elimination, as shown schematically below:

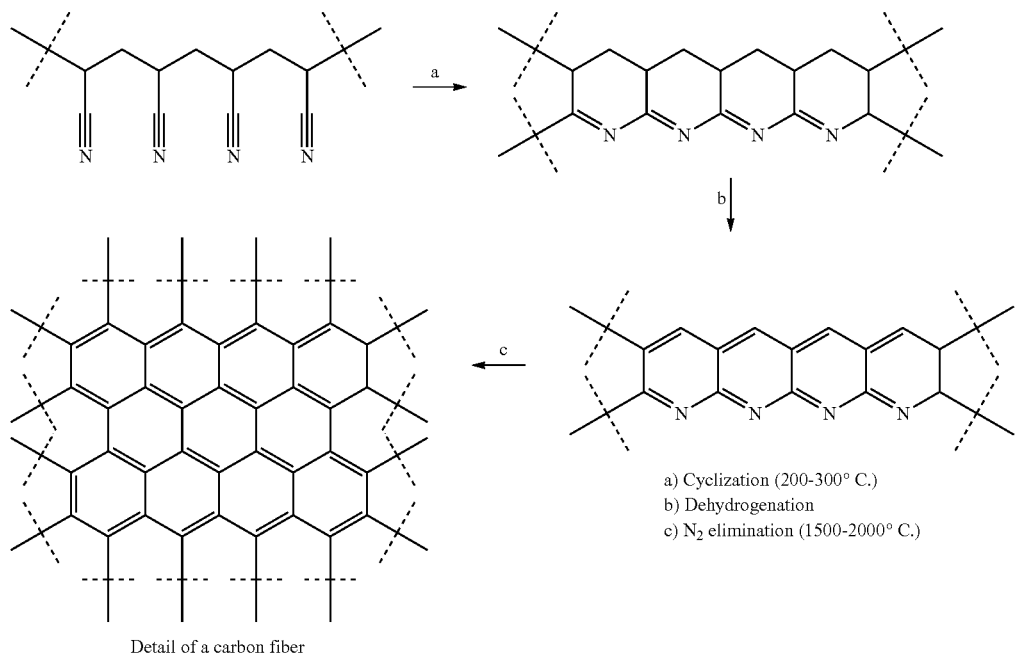

a) Cyclization (200-300° C.)
b) Dehydrogenation
c) $N_2$ elimination (1500-2000° C.)

Detail of a carbon fiber

The cyclization (step a)) in this case takes place partly already in the crosslinking step b), as explained above.

Accordingly, depending on the progress of the reactions, nitrogen atoms may be present on the fiber surface in different hybridization states. These can be determined, for example, by XPS (X-ray photoelectron spectroscopy).

According to the invention, carbonization is carried out, for example, in a furnace at 500 to 2500° C., preferably 600 to 900° C., even more preferably 800 to 875° C., i.e. preferably at comparatively low temperatures of 600 to 900° C., particularly preferably at about 800° C. to 850° C.

Alternatively, carbonization can also be carried out with laser or IR heating as well as with microwave treatment.

According to the invention, it is not the type of heating that is important, but rather maintaining the specified temperatures during carbonization, in order to achieve the claimed properties of the fiber material.

The pore size in the carbon fiber material obtained after carbonization decreases continuously from low carbonization temperatures (about 600° C.) to higher carbonization temperatures (about 1000° C.), as the inventors have found. Above 850° C., the pore size becomes so small that $CO_2$ or $NH_3$ can no longer diffuse into the pores, so that a sudden change in the adsorption properties of the material with respect to $CO_2$ and $NH_3$ can be observed above this temperature. A temperature of 800 to 850° C. is particularly suitable, since $CO_2$ is still adsorbed well here, but the pores for $N_2$ and Ar are already too small.

The conductivity of the carbon fiber material obtained also depends on the carbonization temperature, as the inventors have found. When carbonized in the temperature range of 800 to 850° C., the electrical conductivity is higher than, for example, when carbonized at 600° C. or 700° C., which makes the material more suitable for use as an electrode.

According to the invention, the carbonization treatment is carried out under a protective gas (inert gas). Suitable gases include nitrogen, argon or helium, most preferably argon. The inert gas can be introduced into the furnace, for example, and a gas flow can be maintained during the reaction period. Prior to the carbonization treatment, the furnace is preferably evacuated and flooded with the inert gas, e.g. argon, to prevent the introduction of air. The atmosphere in the furnace is as free as possible from $O_2$ and $CO_2$ due to an inert gas atmosphere. According to the invention, carbonization is carried out, for example, at atmospheric pressure under a protective gas atmosphere, typically under argon at a flow rate of about 200 l/h, for example. It is expected that the process can be carried out at other flows or pressures without significant effects on the product being observed. The duration of the carbonization treatment is typically 1.5 to 5 h, preferably 2 to 4 h, more preferably 3 h. The heating rate is typically 200 to 400° C./h, preferably 250 to 350° C./h, most preferably 300° C./h. The cooling rate is typically 150 to 250° C./h, preferably 200° C./h. In each case, the heating and cooling times are not included in the specified carbonization time, but are additional.

Figure 7:
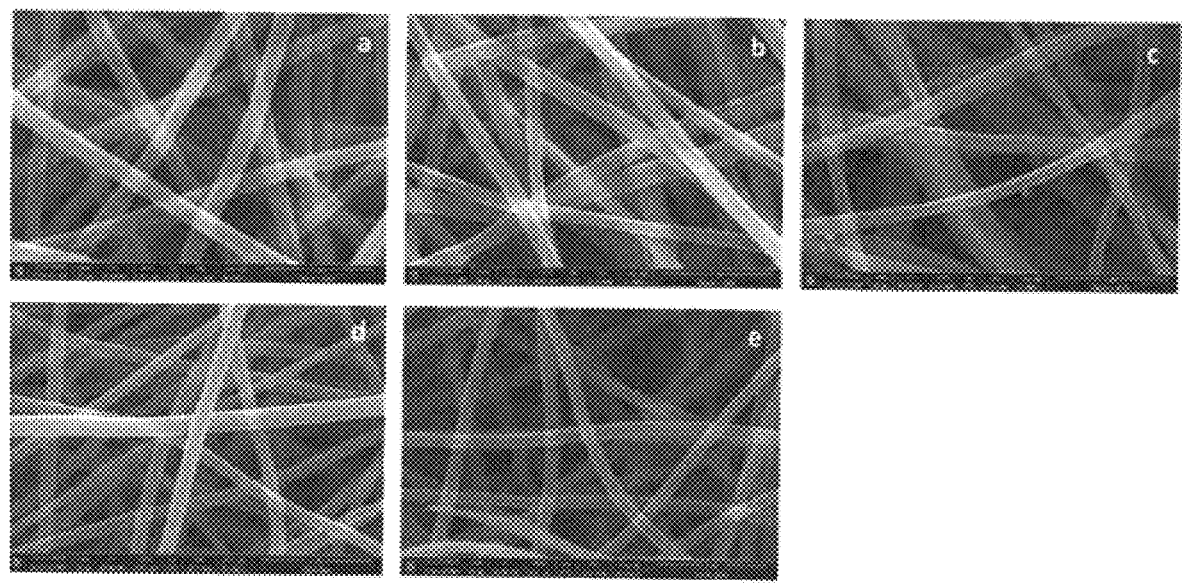
FIG. 7 shows SEM images (30,000 magnification, 20 kV) of carbon fibers according to the invention.

The carbon fiber material obtained by the process according to the invention shows flat surfaces of the fiber and, due to the lateral movement of the needle during electrospinning, no preferred orientation (i.e., the fiber is not coiled in an orderly manner or arranged in parallel loops). The smooth surface of the fiber was confirmed by SEM (FIG. 7). The fiber diameter is uniform and decreases with increasing carbonization temperature from about 250 nm to 220 nm. The fiber diameter is estimated by scanning electron microscopy (SEM) and ImageJ® software and is based on average values of 20-30 measurements.

The pore size of the carbon fiber material is referred to herein as defined in the IUPAC Technical Report (https://doi.org/10.1515/pac-2014-1117; part 2, General definitions and terminology). It is for ultramicropores <0.7 nm
micropores <2 nm
mesopores 2-50 nm
macropores >50 nm.

The "kinetic diameter" of gases is understood here as the smallest diameter that a molecule can present to its environment. It differs from the atomic diameter, which indicates the atomic size as the size of the electron shell and which is generally much smaller than the kinetic diameter. There are several ways of determining the kinetic diameter according to the CRS Handbook of Chemistry and Physics, namely from viscosity data, the Van der Waals equation and thermal conductivity. A calculation from bond angles, bond lengths, and the Van der Waals semimeters is also possible. In most cases, the kinetic diameters calculated by the various methods differ by only 2-3%.

In the context of the present application, the following kinetic diameters for gases reported in the literature are assumed: $CH_4$ 0.38 nm[1], Ar 0.340 nm[2], $N_2$ 0.364 nm[2], $CO_2$ 0.330 nm[2], $H_2$ 0.29 nm[1], $NH_3$ 0.260 nm[1] or, better matching the experimental results, 0.326 nm[3] ([1] B. Scholes, C. A. et al., *Recent Patents on Chemical Engineering*, 2008, 1, 52-66; [2] D. W. Beck, *Zeolite Molecular Sieves: Structure, Chemistry and Use*, Wiley, New York 1974, 593-724, [3] M. E. van Leeuwen, *Fluid Phase Equilib.*, 1994, 99, 1-18).

According to the invention, the pore size in carbon fiber material can be determined by single gas adsorption measurements of several gases with different kinetic diameters, e.g., Ar, $N_2$, $CO_2$, and $O_2$. The basic principles for the measurement methods are given in the IUPAC Technical Report mentioned above. Accordingly, measurement with argon is suitable for the determination of larger pores, but not for the measurement of ultramicropores. For this purpose, measurement with $CO_2$ is required.

Figure 2:
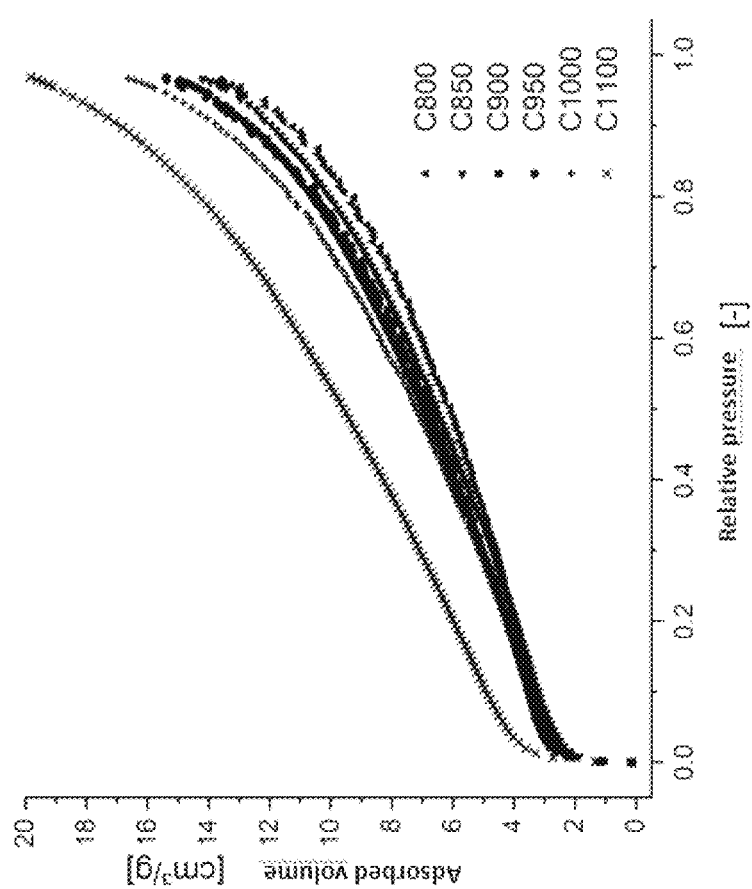
FIG. 2 and FIG. 4 show the adsorbed volume of Ar and $CO_2$, respectively, per g of carbon fiber material at different relative pressures as a function of carbonization temperature.
Figure 6:
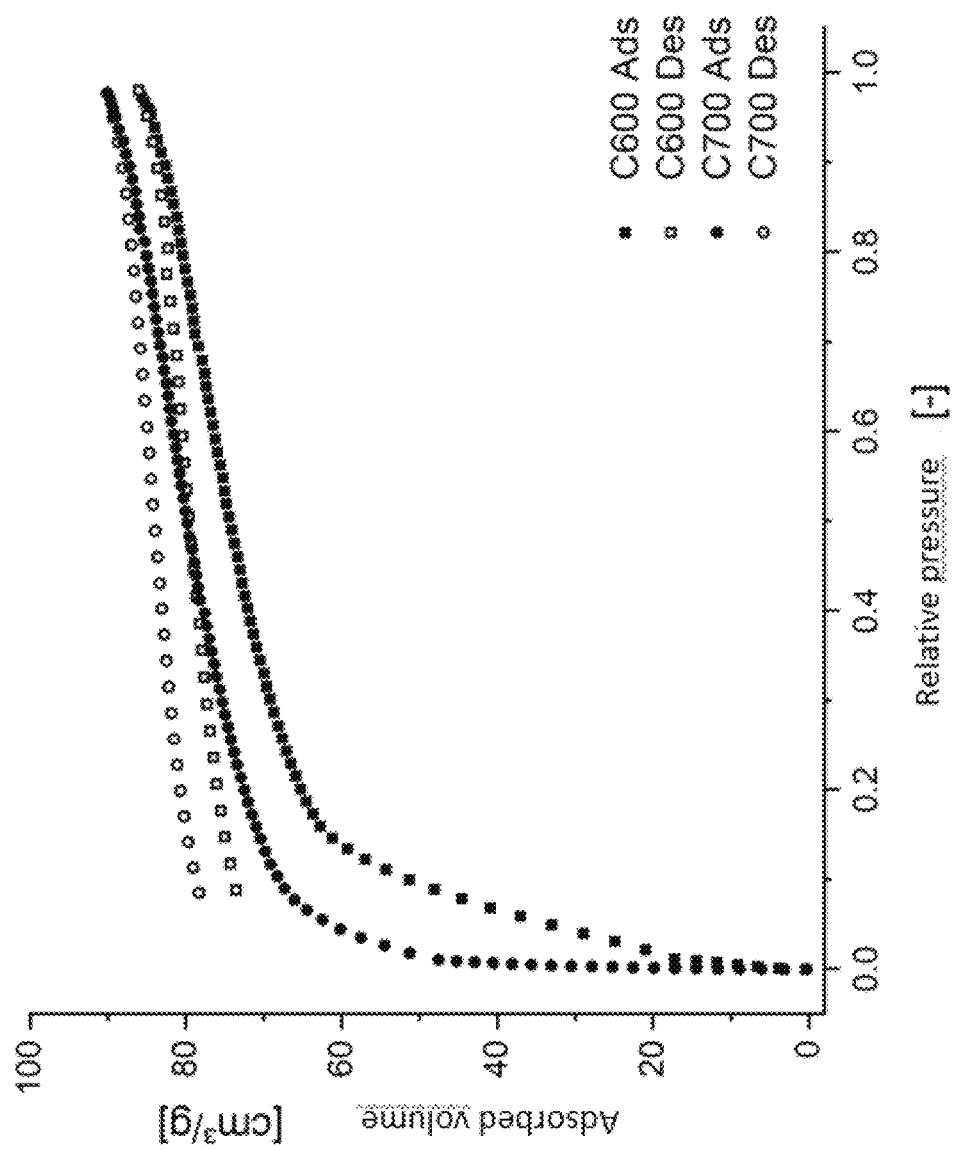
FIG. 6 shows the adsorbed or desorbed volume Ar at different relative pressures for carbonization temperatures of 600° C. and 700° C., respectively.

For example, the pore size is determined by adsorption of Ar, as shown in FIG. 2. Samples carbonized at 600° C. and 700° C. show very slow adsorption kinetics and pseudoirreversibility, which prevents reasonable measurement (cf. FIG. 6). This indicates pores with very small diameters or strong tortuosity of the pores. For samples carbonized at 800° C. and higher, the adsorption of argon is fully reversible without hysteresis.

The BET surface area is determined by the standard method of adsorption of argon gas at 87K followed by evaluation of the range of monolayer adsorption according to the BET model. The instrument software ASiQwin® (Quantachrome) is used for this purpose.

BET surface area measurements with argon are shown in Table 1 below:

TABLE 1

BET surface area of samples from Ar adsorption experiments.

| Sample | $S_{BET}$ (m²/g) |
|---|---|
| C800 | 13.4 |
| C825 | 12.4 |
| C850 | 13.1 |
| C875 | 13.2 |
| C900 | 14.6 |
| C925 | 15.0 |
| C950 | 14.3 |
| C975 | 16.0 |
| C1000 | 14.8 |
| C1100 | 20.0 |

C800 denotes a carbon fiber sample carbonized at 800° C.; the other designations are analogous.

Thus, the BET surface area $S_{BET}$ of the carbon fiber material of the invention, as determined by argon adsorption, is relatively low and ranges from 12 to 20 m²/g with a large variation that increases slightly from samples carbonized at 800° C. to samples carbonized at 1100° C. due to the reduction in fiber diameter (thus larger geometric surface area).

Figure 4:
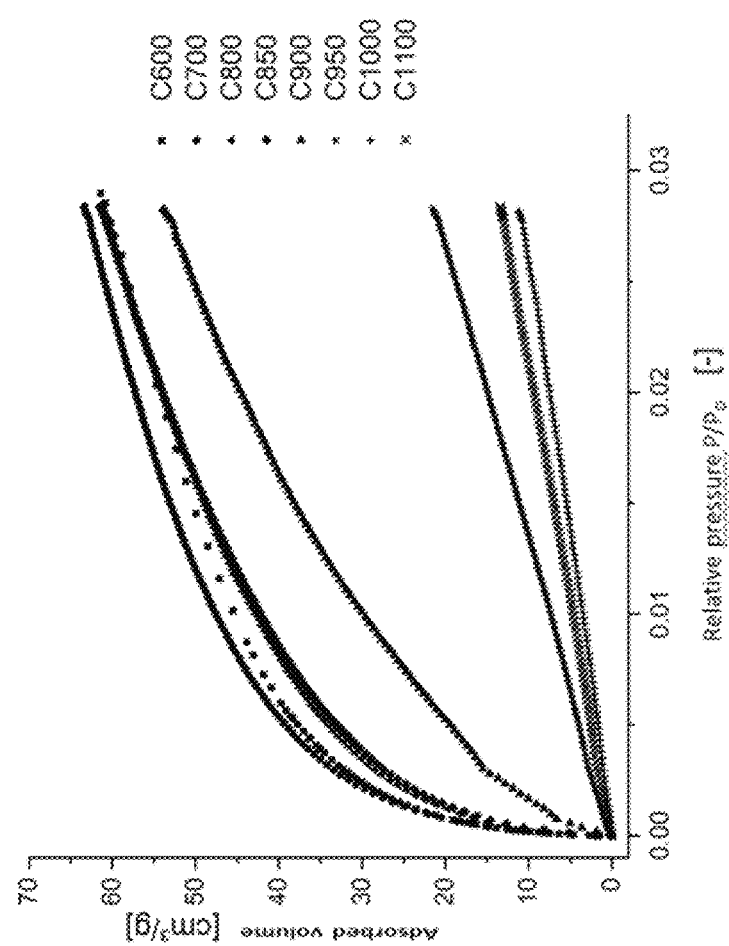
Figure 5:
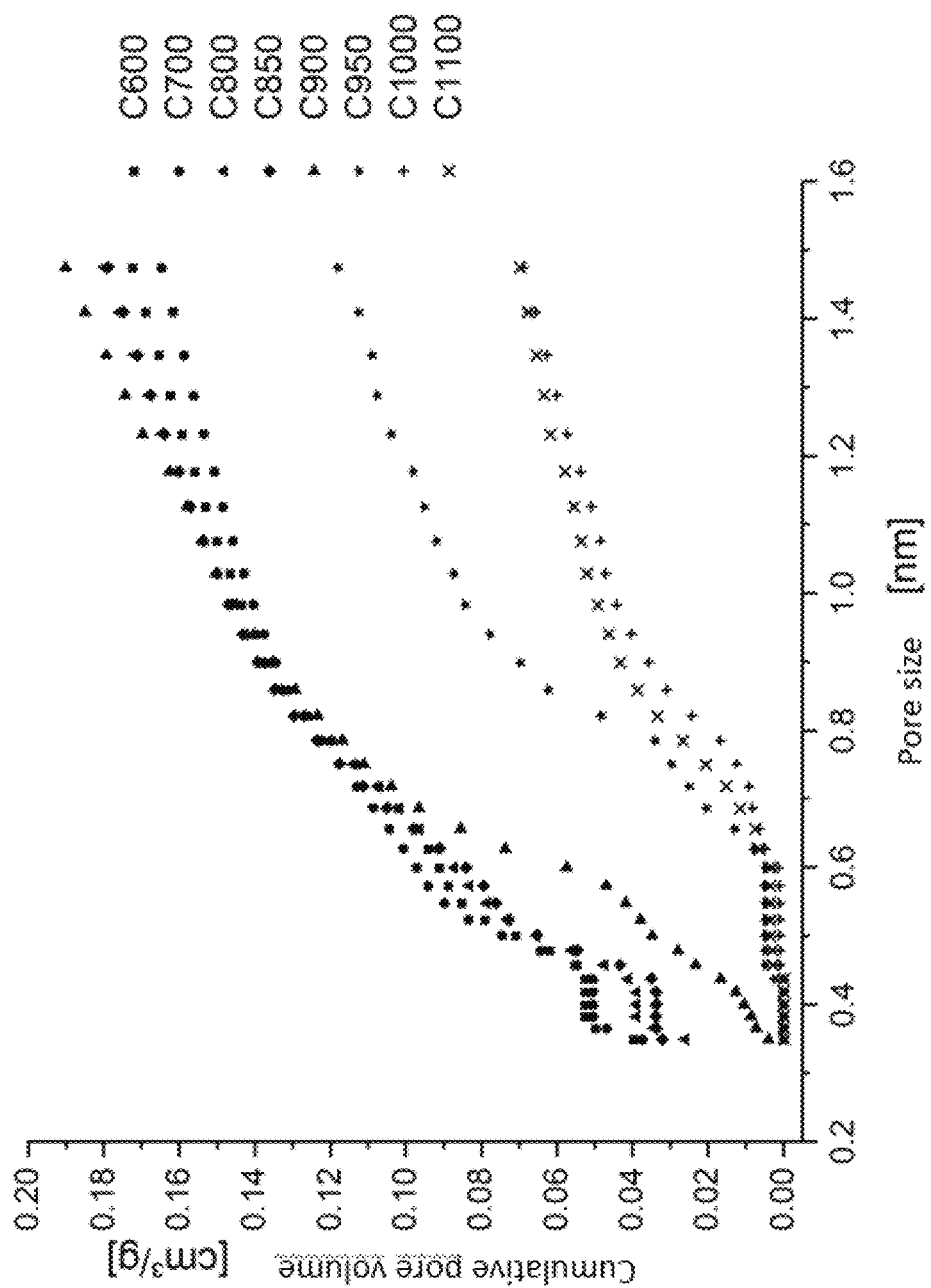
FIG. 5 shows the cumulative pore volume as a function of pore size for different carbonization temperatures.

FIG. 4 shows the $CO_2$ adsorption isotherms of the fibers according to the invention. Unlike the Ar measurements, $CO_2$ adsorption could be easily measured for the samples carbonized at 600° C. and 700° C., implying a kinetic inhibition of Ar adsorption, since the adsorption of $CO_2$ at 273 K is much faster than that of Ar at 87 K. The isotherms show a similar shape from C600 to C850, namely a steep slope that flattens at higher pressures. The initial slope is slightly higher for C600 and C700 than for C800 and C850, indicating a higher adsorption energy due to a higher number of narrower pores or a change in surface chemistry. However, the difference is not very large and the total pore volume at 1 bar is almost identical. C900 shows a smaller initial slope but only a slightly reduced amount of adsorbed $CO_2$ at 1 bar, while the initial slope and total adsorbed volume decrease significantly at carbonization temperatures of 950° C. and above. C1100 achieves a slightly larger adsorbed volume than C1000, which may be attributed to the slightly increased surface area without significant change in porosity or surface chemistry.

Figure 3:
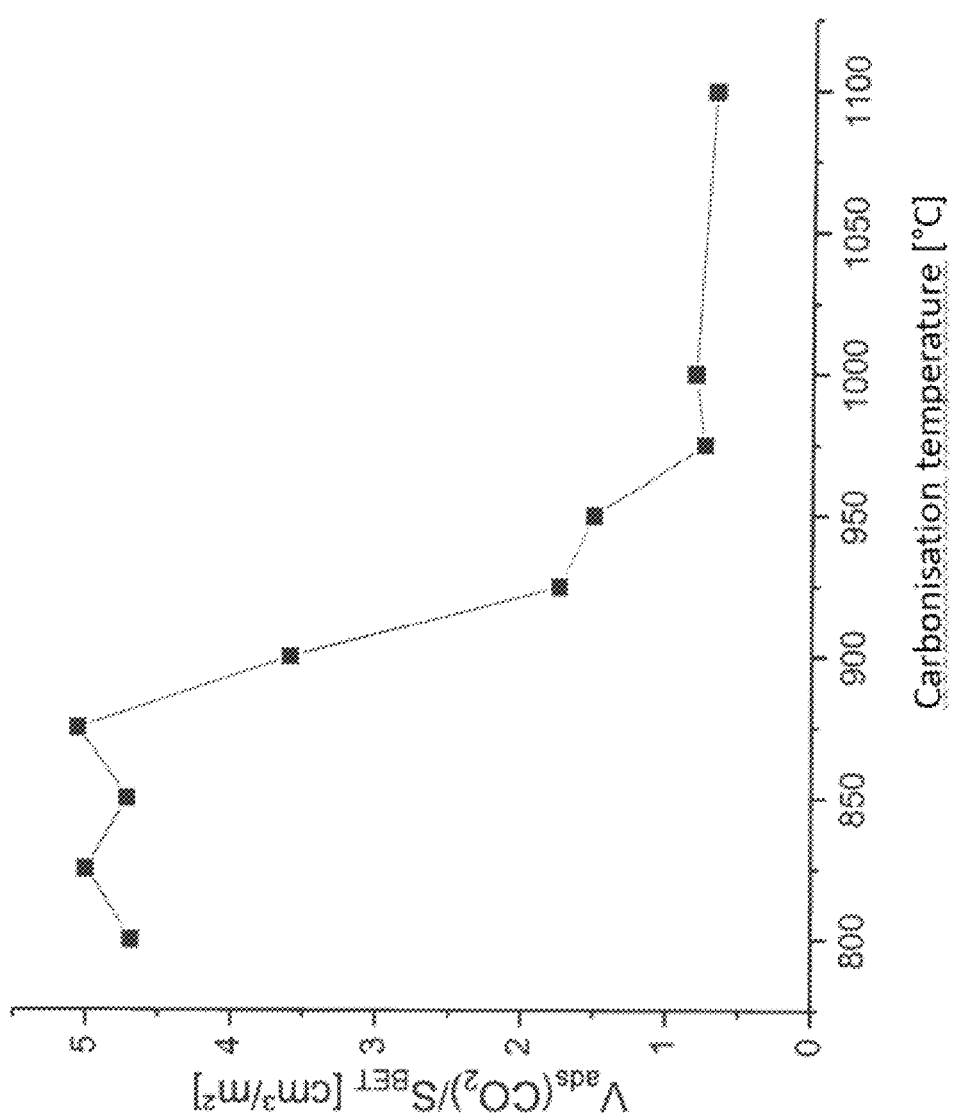
FIG. 3 shows the dependence of the quotient of adsorbed $CO_2$ volume and surface area of the material as a function of carbonization temperature. It can be clearly seen how the quotient drops steeply at about 850° C., and hardly changes at all from about 980° C. onwards.

FIG. 3 shows that adsorbed $CO_2$ volume divided by BET surface area is a measure of surface affinity for $CO_2$. The value is practically constantly 5 cm³/m² for C800 to C875, and drops steeply to less than 1 cm³/m² at higher carbonization temperatures >950° C. The 5 cm³/m² value is exceptionally high compared to other carbon materials, which typically require a surface area of several hundred m² to achieve a similarly high $CO_2$ adsorption capacity. This phenomenon exhibited by the carbon fiber material of the invention could be attributed to a high chemical affinity for $CO_2$ or a high ultramicroporous volume, where the ultramicropores are not accessible to Ar and therefore contribute nothing to the BET surface area.

The textural properties of the carbon fiber materials of the invention derived from $CO_2$ adsorption tests compared to three known commercially available carbons (carbon blacks) are summarized in Table 2 below:

TABLE 2

Texture properties derived from $CO_2$ adsorption experiments

| Carbonisation temperature ° C. | $S_{micro}$ (MC) m²/g | $V_{<0.4\,nm}$ (MC) cm³/g | $V_{>0.4\,nm}$ (MC) cm³/g | $V_{ges.}$ (MC) cm³/g |
|---|---|---|---|---|
| 600 | 626 | 0.053 | 0.119 | 0.172 |
| 700 | 618 | 0.051 | 0.114 | 0.165 |
| 800 | 615 | 0.039 | 0.141 | 0.180 |

TABLE 2-continued

Texture properties derived from $CO_2$ adsorption experiments

| Carbonisation temperature ° C. | $S_{micro}$ (MC) m²/g | $V_{<0.4\,nm}$ (MC) cm³/g | $V_{>0.4\,nm}$ (MC) cm³/g | $V_{ges.}$ (MC) cm³/g |
|---|---|---|---|---|
| 825 | 599 | 0.039 | 0.133 | 0.172 |
| 850 | 610 | 0.034 | 0.145 | 0.179 |
| 875 | 656 | 0.035 | 0.156 | 0.191 |
| 900 | 551 | 0.011 | 0.179 | 0.190 |
| 925 | 318 | 0.004 | 0.132 | 0.136 |
| 950 | 274 | 0 | 0.118 | 0.118 |
| 975 | 160 | 0 | 0.071 | 0.071 |
| 1000 | 151 | 0 | 0.069 | 0.069 |
| 1100 | 165 | 0 | 0.070 | 0.070 |
| SuperP | 299 | 0 | 0.134 | 0.134 |
| GP300 | 321 | 0.004 | 0.126 | 0.130 |
| BP2000 | 1173 | 0.007 | 0.470 | 0.477 |

$S_{micro}$ is the surface area of the micropores
$V_{<0.4\,nm}$ is the volume of pores with a pore size < 0.4 nm
$V_{>0.4\,nm}$ is the volume of pores with a pore size > 0.4 nm
$V_{ges.}$ is the total pore volume
$E_{ads}$ is the asorption energy
MC means determined according to a Monte Carlo simulation (Grand Canonical Monte Carlo Simulation (GC-MC))
SuperP is Carbon black SuperP ® of the company Alfaesar
GP300 is Graphene platelets from Sigma-Aldrich with a specified BET surface area of 300 m²/g
BP2000 is Black Pearls ® 2000 Carbon Black from Cabot The pore volume was calculated from GC-MC and shown divided into pores larger and smaller than 0.4 nm. The pore volume <0.4 nm decreases with increasing carbonization temperature, while the total pore volume increases slightly from C600 to C900, as does the micropore surface area. C1000 shows no pores below 0.4 nm and a sharp decrease in total pore volume and surface area.

The commercial carbon materials show no pores <0.4 nm at all, which explains their low $CO_2$ uptake at low pressures. In contrast, the carbon fiber material according to the invention shows a high percentage of ultramicropores $V_{<0.4\,nm}$ of 0.01 to 10, more preferably 0.02 to 5, even more preferably 0.025 to 0.1, most preferably 0.03 to 0.06 cm³/g, determined by $CO_2$ adsorption and evaluation with DFT and GC-MC simulation.

Figure 8:
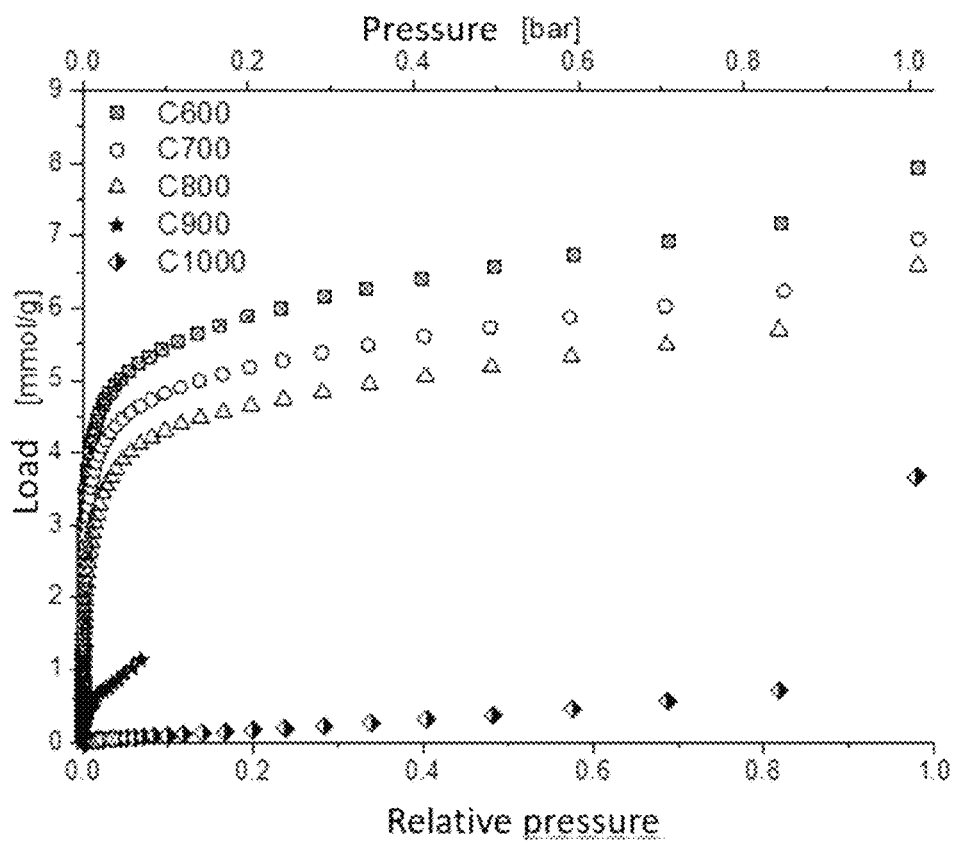
FIG. 8 to FIG. 10 show $NH_3$ isotherms measured at 240 K, 273 K and 298 K, respectively, on samples of the invention carbonized at different temperatures.
Figure 9:
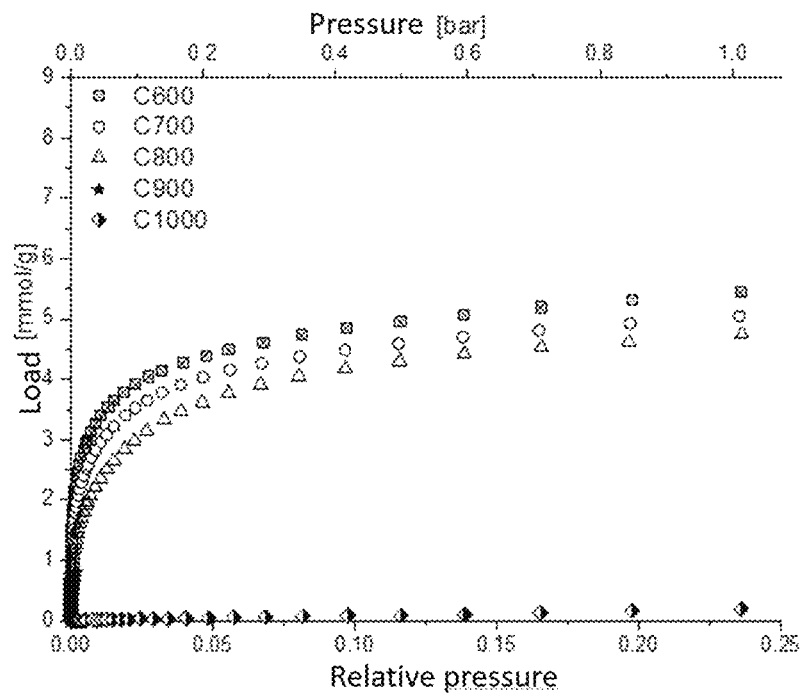
Figure 10:
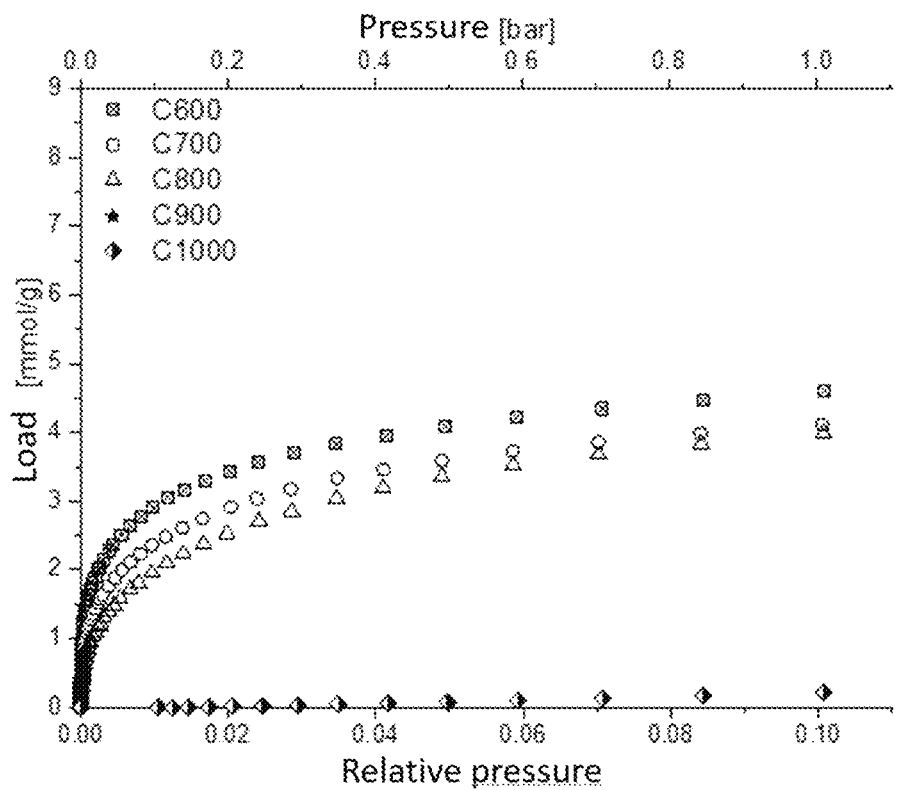

FIGS. 8 to 10 show adsorption isotherms of ammonia measured on different samples according to the invention at different temperatures.

Surprisingly, $NH_3$ and $CO_2$ were found to show the same tendency with the materials according to the invention: very high adsorption was obtained at C600 to C800. C900 proved to be kinetically hindered. At C1000, only a low adsorption of the respective gas was observed. $NH_3$ as a Lewis base and $CO_2$ as a Lewis acid require different surface chemistry for effective adsorption. It is very unlikely that chemically different molecules will exhibit the same adsorption behavior due to changes in the surface chemistry of the adsorbent. Therefore, in the materials according to the invention, the surface structure or chemistry is not the decisive factor for adsorption, but the accessibility of the ultramicropores.

Figure 11:
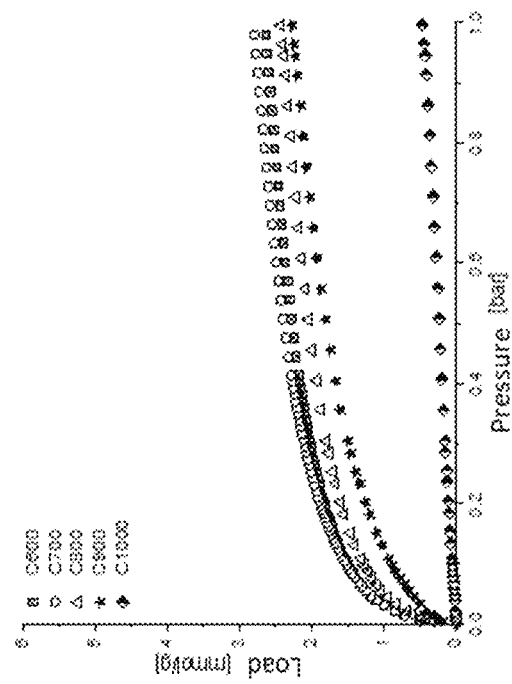
FIG. 11 shows a comparison of the isotherms of $NH_3$ and $CO_2$, each measured at 273 K on samples according to the invention carbonized at different temperatures. The left part of the figure shows the adsorption of $NH_3$, the right part the adsorption of $CO_2$.
Figure 11:
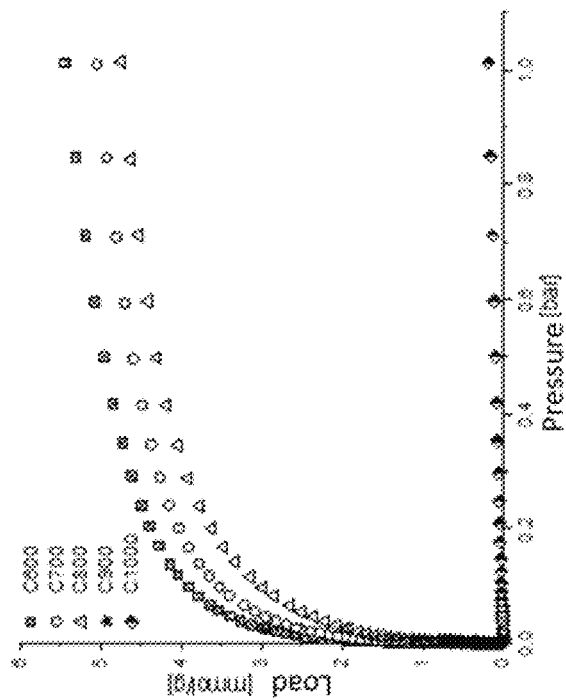

Comparison of the adsorption of $NH_3$ and $CO_2$ (FIG. 11) shows that at C600 to C800 $NH_3$ is adsorbed in greater amounts than $CO_2$. However, at C1000, $CO_2$ is adsorbed more than $NH_3$. This could be due to the fact that $NH_3$ has access to a larger number of pores, the pores can be packed more densely with $NH_3$, i.e., more molecules of $NH_3$ fit into the same pore than molecules of $CO_2$, or that there is a different surface chemistry in the pores.

It is known from the literature (M. Goncalves et al., Environ. Sc. Technol. 2011, 45, 10605-10610) that the $NH_3$ adsorption capacity increases linearly with the amount of oxygen surface groups. However, no correlation between surface chemistry (oxygen or nitrogen) and $NH_3$ adsorption capacity was observed in the samples according to the invention, as shown in the following tables.

The elemental composition of the samples was determined by elemental analysis and XPS and is summarized in the following tables:

TABLE 3

CHNO analysis

| Sample | C (wt.-%) | N (wt.-%) | O (wt.-% | H (wt.-%) |
|---|---|---|---|---|
| C600 | 63.5 | 23.0 | 11.8 | 2.1 |
| C700 | 67.9 | 19.9 | 11.1 | 1.8 |
| C800 | 72.6 | 16.2 | 10.6 | 1.4 |
| C900 | 77.6 | 11.6 | 9.5 | 1.2 |
| C1000 | 91.5 | 7.1 | 3.1 | 0.4 |
| C1100 | 95.8 | 3.7 | 0.8 | 0.5 |

TABLE 4

XPS analysis

| Sample | C (at.-%) | N (at.-%) | O (at.-%) |
|---|---|---|---|
| C600 | 76.5 | 19.7 | 3.8 |
| C700 | 80.4 | 16.8 | 2.8 |
| C800 | 84.1 | 13.7 | 2.2 |
| C900 | 86.6 | 11.0 | 2.4 |
| C1000 | 92.6 | 4.3 | 3.1 |
| C1100 | 95.1 | 3.1 | 1.8 |

This represents a further indication that, according to the invention, the pore size is the determining factor for the adsorption capacity, and not the surface chemistry.

For the fiber materials of the invention, the adsorption data correlate strongly with the kinetic diameter of the adsorbate.

The correlation between kinetic diameter and adsorption capacity of the samples according to the invention is shown in the following table:

TABLE 5

Kinetic diameter and adsorption capacity.

| Gas | Kinetic diameter (pm) | Samples with high adsorption capacity |
|---|---|---|
| $N_2$ | 364 | 0600*-0700* |
| Ar | 340 | 0600-0900* |
| $CO_2$ | 330 | 0600-0900* |
| $NH_3$ | 260/326 | |

*kinetically hindered

The arrow on the right means that the adsorption capacity increases from top to bottom.

The smaller the molecules or atoms, the smaller the pores into which they can penetrate. The pore size decreases with increasing carbonization temperature. Therefore, the adsorption capacity changes drastically from one sample to another if molecules can no longer penetrate the pores. Therefore, the kinetic diameter and the pore size effect consistently explain the adsorption behavior of the nanofiber mats according to the invention.

0.26 nm is a value often reported in the literature as the kinetic diameter for $NH_3$. However, it has been shown that this value cannot adequately explain experimental data, especially for pore diffusion. In contrast, the value determined by van Leeuwen (0.326 nm) is in good agreement with the findings of Kanezashi et al. and is therefore used here. (M. Kanezashi, A. Yamamoto, T. Yoshioka, T. Tsuru, A. I. Ch. E., 2010, 56, 1204-1212, M. E. van Leeuwen, *Fluid Phase Equilib.*, 1994, 99, 1-18).

$CO_2$ and $NH_3$ show similar behavior because they have comparable molecular size. $CO_2$ and $NH_3$ have very slow adsorption kinetics on C900 (very small pores). However, surface chemistry has only a minor effect on adsorption.

$NH_3$ is adsorbed more strongly than $CO_2$ (C600 to C800) on samples with a larger number of accessible pores. $CO_2$, in contrast, is slightly favored when pores are not accessible (C1000). Surface chemistry favors $CO_2$ adsorption somewhat, at least for C1000.

Figure 14:
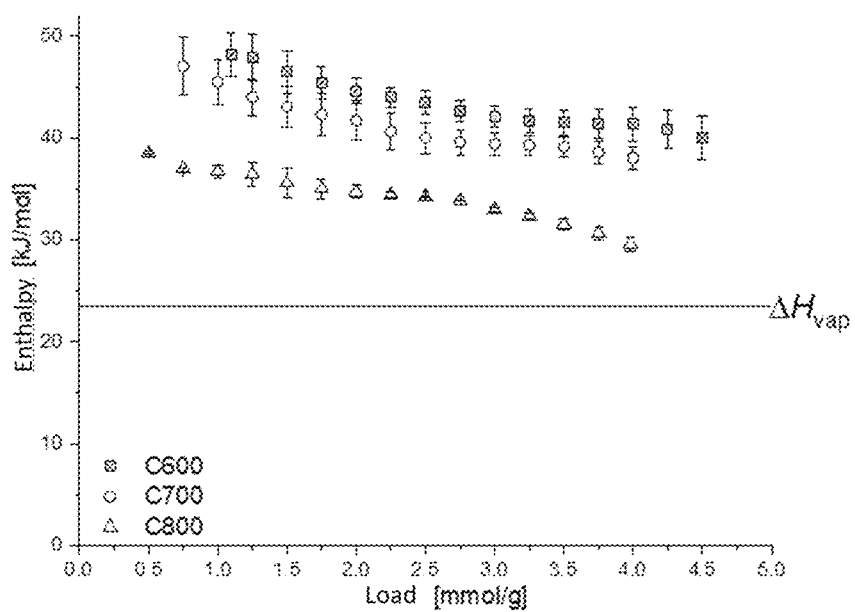
FIG. 14 shows the isosteric adsorption enthalpy of $NH_3$ measured with samples according to the invention carbonized at different temperatures. The enthalpy of adsorption was determined by the isosteric method. The data used for this purpose were obtained from the isotherms by linear interpolation between two isotherm points.

FIG. 14 shows the isosteric adsorption enthalpies of $NH_3$ on the samples. Higher values indicate stronger adsorption of $NH_3$ on the sample.

Figure 12:
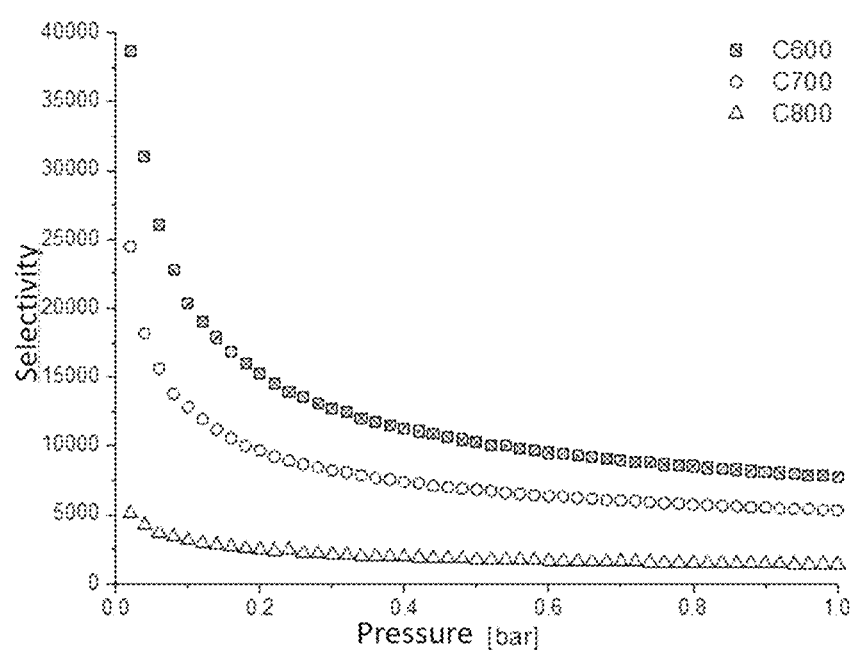
FIG. 12 shows the $NH_3/N_2$ selectivity (IAST) of a gas composition with a molar ratio of 0.001:99.999 ($NH_3/N_2$) with samples according to the invention carbonized at different temperatures.
Figure 13:
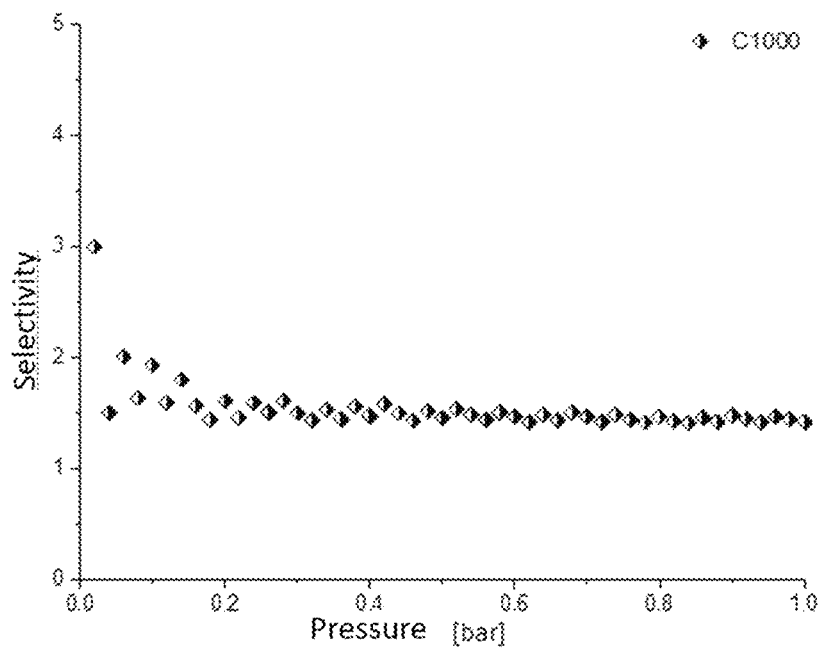
FIG. 13 shows the $NH_3/N_2$ selectivity (IAST) of a gas composition with a molar ratio of 10:90 with a sample according to the invention carbonized at 1000° C.

IAST (ideal adsorbed solution theory) calculations predict excellent selectivity of the materials of the invention for $NH_3$ over $N_2$. The results are shown in FIGS. 12 and 13.

However, the calculations should only be considered as approximations, since strongly different adsorbing components can lead to deviations in IAST calculations. The IAST results can be well explained by a molecular sieve effect. C600 to C800 have pores that are accessible to $NH_3$ but not to $N_2$. This results in high values for selectivity. At C1000, i.e. for a material without accessible pores, the selectivity for $NH_3$ decreases strongly.

Figure 15:
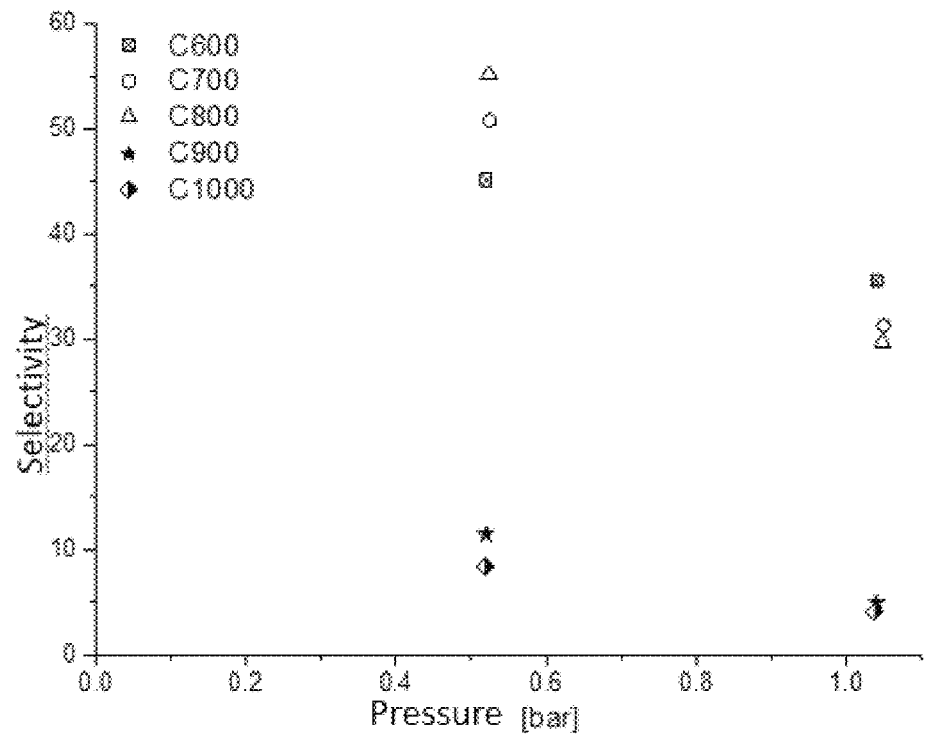
FIG. 15 shows the $CO_2/N_2$ selectivity at a $CO_2:N_2$ gas volume ratio of 5:95, measured by dynamic gas adsorption for samples carbonized at different temperatures according to the invention.
Figure 16:
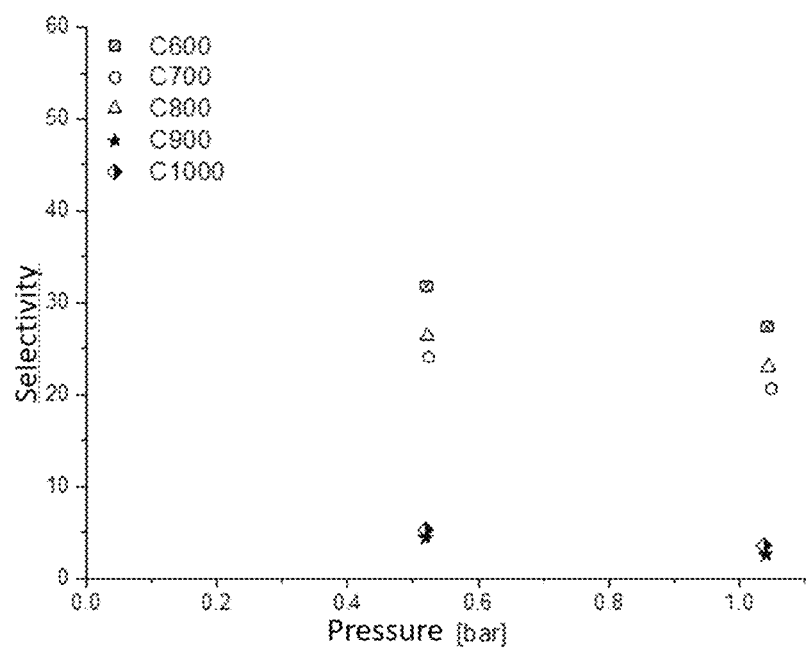
FIG. 16 shows $CO_2/N_2$ selectivity at a $CO_2:N_2$ gas volume ratio of 10:90, measured by dynamic gas adsorption for samples according to the invention carbonized at different temperatures.

FIGS. 15 and 16 show measured values for $CO_2/N_2$ selectivity that are in agreement with IAST predictions (about 25-55 for C600-C800). To the knowledge of the inventors, these values are among the highest measured to date for $CO_2/N_2$ on carbon-based samples.

For comparison, IAST calculations on $CO_2/N_2$ selectivity are shown in FIG. 17. These are slightly higher than the measured values (high double-digit to low triple-digit range).

The carbon fiber material according to the invention is particularly applicable for the separation of $CO_2$ or $NH_3$ from gas mixtures. The gas mixtures can be, for example, air, combustion exhaust gases, natural gas, biogas or other gas mixtures.

$H_2$ can also be separated from suitable gas mixtures (e.g. $CH_4/H_2$) by means of the carbon fiber materials according to the invention due to its small kinetic diameter.

The materials according to the invention can advantageously be used as adsorbents in the Pressure Swing, alternatively in the Temperature Swing as well as, with particular advantage due to the especially high selectivity at low pressures, in the Vacuum Swing adsorption process.

The carbon fibers of the invention, especially those carbonized at 1000° C. (C1000), can also adsorb large amounts of water. They could therefore be used advantageously for drying gases.

For the same reason, before separating $CO_2$ or $NH_3$ from gases, it is important to dry these gases, e.g. by cooling, since water vapor competes with $CO_2$ or $NH_3$, respectively, and would therefore reduce the separation efficiency of the membrane.

EXAMPLES

Synthesis of Carbon Fibers

Example 1

PAN from sigma-aldrich or BOC Sciences with a molecular weight of 150,000 g/mol was used.

Carbon fibers were prepared by electrospinning. First, solutions of 10% polyacrylonitrile (PAN) in dimethylformamide (DMF) were prepared. For this purpose, 4 g of PAN was dissolved in 36 g of DMF under stirring with a magnetic stirrer at room temperature for two days. The different samples were prepared from the same solution. The solution was spun directly into fiber mats in a controlled atmosphere by an electrospinner from IME Technologies. The parameters shown in Table 6 were used for this purpose.

TABLE 6

Standard parameters for elektrospinning

| | | |
|---|---|---|
| Climate | Temperature | 25° C. |
| | Humidity | 20% |
| Material | Flow rate | 40 µL/min |
| | Volume | 2.2 mL |
| | Spinning time | 1 h/2 h |
| | PAN wt % | 10 |
| Lateral Movement | Total distance | 100 mm |
| | Start position | −50 mm |
| | Distance | 100 mm |
| | Speed | 20 mm/s |
| | Reversal delay | 500 ms |
| Distances | Needle-collector | 140 mm |
| | Inner needle diameter | 0.8 mm |
| Collector movement | Rotation | 1500 Upm |
| Voltage | Positive electrode | 21 kV |
| | Negative Electrode | −4 kV |

After the electrospinning process, the mats were dried in the oven in air at 150° C. overnight and then crosslinked in air atmosphere at 250° C. overnight. Finally, after reaching the target temperature, the crosslinked mats were carbonized for 3 hours at 1000° C. in the previously evacuated and argon-flooded oven and then cooled. The heating rate was 300° C./h, the cooling rate 200° C./h, and the argon flow rate 200 L/h.

Example 2

A 10 wt % solution of PAN (Mw 150,000 g/mol) in DMF was prepared by adding 8 g PAN to 72 g DMF and stirring at room temperature for two days. This solution was used in the electrospinning process to prepare PAN nanofiber mats. The process was carried out in a controlled atmosphere with the parameters given in Table 7:

TABLE 7

Parameters for the electrospinning process using a 10 wt % solution of PAN in DMF

| | | |
|---|---|---|
| Climate | Temperature | 25° C. |
| | Humidity | 30% |
| Material | Flow rate | 40 µL/min |
| | Volume | 14.6 mL |
| | Spinning time | 6 h |
| | PAN wt % | 10 |
| Lateral movement | Total distance | 120 mm |
| | Starting position | −60 mm |
| | Distance | 120 mm |
| | Speed | 20 mm/s |
| | Reversal delay | 500 ms |
| Distances | Needle-collector | 180 mm |
| | Inner needle diamater | 0.8 mm |
| | Collector diameter | 60 mm |

TABLE 7-continued

Parameters for the electrospinning process using a
10 wt % solution of PAN in DMF

| Collector movement | Rotation | 1500 rpm |
|---|---|---|
| Voltage | Positive electrode | 21 kV |
| | Negative electrode | −4 kV |

Subsequently, the obtained PAN nanofiber mats were dried at 150° C. for 1 h. Crosslinking was carried out in an air atmosphere at 250° C. overnight (18 h). For carbonization, the samples were heated at a heating rate of 300° C./h under a stream of argon (200 L/h) until the desired carbonization temperature was reached, which was maintained for 3 h. The cooling rate was 200° C./h. The carbonization temperature was maintained until the desired carbonization temperature was reached. The cooling rate was 200° C./h. Samples for the 600 to 1000° C. temperature series (C600 to C1000) were prepared from the same solution.

Analytics
REM

SEM images were acquired using an ETD detector on an FEI Quanta® FEG 650 with a magnification of 30,000×. The accelerating voltage was 20 kV. During sample preparation, the samples were glued to the sample holder and grounded with a copper strip. The diameters of the fibers were estimated using the ImageJ® program. The average diameter of a sample is based on a measurement of 20 to 30 fiber diameters.

Gas Adsorption

Gas adsorption experiments were performed on a Quantachrome Autosorb® iQ2 instrument equipped with a cryocooler. For preparation, samples were cut into small strips approximately 1 mm wide, of which 30-100 mg were transferred to the sample tube. The samples were then baked at 300° C. for 8 hours. To determine the sample mass, both the empty sample tube and the tube filled with sample were weighed three times each after bake-out. The weight of the sample was calculated from the difference in the average masses. The gas adsorption measurements with the gases argon, nitrogen and oxygen were carried out in different sequences on the same sample. Several measurements were taken at different temperatures for each gas and sample. The order of the measurements was not determined systematically and was based on metrological considerations at the time of the measurement.

Dynamic Gas Adsorption

Dynamic gas adsorption experiments were performed with a mixSorb® SHP from 3P Instruments. Control and evaluation were performed using mixSorb Manager® software (version 1.2.3.0) and 3P Sim® (version 1.0.7).

The composition of the injected gases was adjusted by means of several mass flow controllers (MFC). Measurement of the gas composition downstream of the sample column was performed using a Pfeiffer mass spectrometer (MS) (Pfeiffer Omnistar® GSD 320). The sample column was temperature controlled using either a water/ethylene glycol bath (−10 to 70° C.) or a heating jacket (90 to 400° C.). The stainless steel sample column is filled with sample to a height of 8.5 cm, has an inner diameter of 0.45 cm and a sample volume of about 1.0 cm³. A temperature sensor is inserted 2.5 cm into the bulk from the top.

Before a measurement, 110-160 mg of the corresponding sample was first cut into strips about 1 cm long and 1 mm wide and introduced into the sample column using a funnel. Voids were filled by careful stuffing with a rod. The empty weight and the weight of the sample column with sample were each determined three times.

The first heating of a sample was performed at 300° C. for 2 h at an applied vacuum and a flow of the carrier gas (helium) of 7 mL/min to remove adsorbed water and other gases. Further bakeout after a measurement sequence was performed for 1 h at 70° C., with vacuum applied and a flow of carrier gas of 7 mL/min.

To start a measurement, the specified pressure was built up with the carrier gas helium. When temperature as well as pressure were stable, the experiment was started by adding the adsorptives $CO_2$ and $N_2$ to the sample column. The corresponding parameters can be taken from Table 8. After completion of a breakthrough experiment, the next breakthrough experiment of the sequence was started by increasing the adsorptive fraction to the specified value of the next measurement point. After the end of a sequence, bakeout was performed as described and the next sequence was performed analogously.

TABLE 8

Parameters of the measurement sequences. Helium was used
as carrier gas, $CO_2$ and $N_2$ as adsorptive gas.

| | Total pressure [bar] | Temperature [° C.] | 1. measuring point | 2. measuring point |
|---|---|---|---|---|
| 1. Sequence | 5.0 | 0 | $CO_2$: 0.5%<br>$N_2$: 9.5%<br>He: 90.0% | $CO_2$: 1.0%<br>$N_2$: 19.0%<br>He: 80.0% |
| 2. Sequence | 5.0 | 0 | $CO_2$: 1.0%<br>$N_2$: 9.0%<br>He: 90.0% | $CO_2$: 2.0%<br>$N_2$: 18.0%<br>He: 80.0% |

For each sequence, a reference measurement was also taken using glass beads (0.4-0.6 mm diameter) as filler material. The adsorbed amount of $CO_2$ and $N_2$ was obtained from the difference between the sample and reference measurements.

The selectivity was determined with the following formula:

$$S = \frac{n_{CO_2}}{n_{N_2}} \cdot \frac{y_{N_3}}{y_{CO_2}}$$

$n_i$—adsorbed amount of substance i in the adsorbed phase
$y_i$—Volume amount of i in the gas phase

BET

The quantitative evaluation of the measured gas adsorption isotherms according to the BET method was performed using the function implemented in the ASiQwin® (Quantachrome) instrument software. The range of values used for the evaluation was determined by the "Micropore BET assistant" available in the software in order to achieve a reproducible point selection according to the recommended criteria. Since the parallel measurement of the saturation vapor pressure (actually recommended[2] for highest accuracy especially for the determination of mesopores) with the use of the cryocooler means giving up half of the measurement capacity and is not possible for vapor pressures >1 bar/760 Torr anyway, the saturation vapor pressures for all measurements were taken from the NIST database. They are summarized in Table 9 below. For adsorption methods, Torr is the usual unit, so that this unit and not the corresponding SI unit is used here.

TABLE 9

Saturation vapor pressures of the gases argon, nitrogen,
oxygen and carbon dioxide as a function of temperature.

| Temperature [K] | $P_0(Ar)$ [Torr] | $P_0(N_2)$ [Torr] | $P_0(O_2)$ [Torr] |
|---|---|---|---|
| 77.35 | 212.3* | 759.55 | 155.61 |
| 87 | 771.94** | 2072.1 | 537.44 |
| 273 | $CO_2$: 26 141 | | |

*own measurement, because below the triple point (only literature values available for solid or gaseous phase)
**value for 87.45 K Further, the following values for the area of a gas molecule were used to calculate BET surface areas:

TABLE 10 used values for the cross-sectional area of argon, nitrogen and oxygen on a surface according to the BET model.

| Gas | Argon @ 87 K | Nitrogen @ 77 K | Oxygen @ 77 K |
|---|---|---|---|
| area of a gas molecule [$Å^2$] | 14.2 | 16.2 | 14.1 |

DFT and GC-MC

The evaluation of the measured isotherms according to the DFT method (Density Functional Theory) and the GC-MC method (Grand Canonical Monte Carlo) was performed by functions implemented in the Quantachrome ASiQwin® software (version 5.0). The given model for carbon dioxide at 273 K was used for slit pores. For Ar at 87 K, the QS-DFT model for slit pores was used. The carbon reference stored in the software was selected as the material.

CHNO

A Varion EL cube elemental analyzer (Elementar, Germany) was used for elemental analysis. 2 mg sample of each fiber material was combusted in CHN mode, and 10 mg sample was combusted in O mode. In CHN mode, the samples were burned, and the combustion products were separated and detected. In O mode, the pores were treated in reducing atmosphere, in which O-containing fragments were converted to CO and detected as such. This procedure was repeated three times for each sample in each mode. Polyethylene was added to the samples carbonized at 900° C. for better combustion.

XPS-Analysis

XPS analyses were used with a Phi5000 VersaProbe II (ULVAC-Phi Inc., US). Monochromatic 1.486 keV $Al_{K\alpha}$ radiation was used for each measurement. Peak analysis was performed with using CasaXPS with Shirley background and instrument-specific corrections. The spectra were calibrated to 284.4 eV using the C1s signal.

The invention claimed is:

1. A method for separating $NH_3$ from a gas mixture comprising $N_2$, the method comprising passing the gas mixture through a separation column filled with a carbon fiber material, thereby separating the $NH_3$ from the gas mixture, wherein the carbon fiber material has been produced by steps of
   a) preparing a solution of polyacrylonitrile in an organic solvent, the solution consisting only of solvent and polyacrylonitrile,
   b) electrospinning of the solution obtained in a) and drying of the obtained fiber material,
   c) crosslinking of the obtained fiber material by heating to 150 to 350° C. in an air or oxygen atmosphere for 1 to 30 hours without applying tensile stress, and
   d) carbonization of the obtained fiber material in an inert gas atmosphere at a temperature in the range of 800 to 850° C. for 1.5 to 5 hours without applying tensile stress, thereby producing the carbon fiber material.

2. The method according to claim 1, wherein the gas mixture is exhaust gas from combustion engines, natural gas, biogas or air.

3. The method according to claim 1, wherein the separating method comprises a pressure swing adsorption process, a temperature swing adsorption process, or a vacuum swing adsorption process.

4. The method of claim 1, wherein in step c) the crosslinking is by heating to 200 to 300° C. for 8 to 30 hours.

5. The method of claim 1, wherein in step c) the crosslinking is by heating to 250° C. for 8 to 30 hours.

6. The method of claim 1, wherein the organic solvent is selected from DMF, DMSO, DMAC, acetone, methyl ethyl ketone, and ethanol and mixtures thereof.

7. The method of claim 1, wherein the solvent is DMF.

8. The method of claim 1, wherein the polyacrylonitrile is a polyacrylonitrile homopolymer or a polyacrylonitrile copolymer having a comonomer content of from 5 to 10 wt %.

9. The method of claim 1, wherein the polyacrylonitrile has a molecular weight in g/mol of from 50,000 to 200,000.

* * * * *